United States Patent
Israelsen

(10) Patent No.: US 10,914,653 B2
(45) Date of Patent: Feb. 9, 2021

(54) INFRARED IMAGING SYSTEMS AND METHODS FOR OIL LEAK DETECTION

(71) Applicant: Quantum IR Technologies, LLC, South Jordan, UT (US)

(72) Inventor: Mark Israelsen, Draper, UT (US)

(73) Assignee: QUANTUM IR TECHNOLOGIES, LLC, South Jordan, UT (US)

(*) Notice: Subject to any disclaimer, the term of this patent is extended or adjusted under 35 U.S.C. 154(b) by 0 days.

(21) Appl. No.: 16/400,757

(22) Filed: May 1, 2019

(65) Prior Publication Data
US 2019/0339159 A1    Nov. 7, 2019

Related U.S. Application Data

(60) Provisional application No. 62/666,610, filed on May 3, 2018.

(51) Int. Cl.
| | |
|---|---|
| *G01M 3/38* | (2006.01) |
| *G06T 7/00* | (2017.01) |
| *G06T 7/11* | (2017.01) |
| *G06T 7/174* | (2017.01) |
| *H04N 5/33* | (2006.01) |
| *G01J 5/54* | (2006.01) |
| *G01J 5/52* | (2006.01) |
| *G01J 5/00* | (2006.01) |

(52) U.S. Cl.
CPC .......... *G01M 3/38* (2013.01); *G01J 5/522* (2013.01); *G01J 5/54* (2013.01); *G06T 7/001* (2013.01); *G06T 7/11* (2017.01); *G06T 7/174* (2017.01); *H04N 5/33* (2013.01); *G01J 2005/0077* (2013.01); *G06T 2207/10048* (2013.01)

(58) Field of Classification Search
CPC . G06T 7/11; G06T 7/174; G06T 7/001; G06T 2207/10048; G01J 5/522; G01J 5/54; G01J 2005/0077; H04N 5/33
See application file for complete search history.

(56) References Cited

U.S. PATENT DOCUMENTS

| | | |
|---|---|---|
| 6,853,452 B1 | 2/2005 | Laufer |
| 9,987,752 B2 * | 6/2018 | Fisher .................. G05D 1/0016 |
| 10,464,213 B2 * | 11/2019 | Fisher .................. G06K 9/4661 |
| 2006/0091310 A1 | 5/2006 | Furry |

(Continued)

OTHER PUBLICATIONS

International Search Report and Written Opinion issued in corresponding PCT Application No. PCT/US2019/030226, dated Jul. 17, 2019.

*Primary Examiner* — Taeho Jo
(74) *Attorney, Agent, or Firm* — Maschoff Brennan

(57) ABSTRACT

A system for detecting an oil leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect an oil leak. The imaging analysis computer can be configured to detect oil on a surface (e.g., solid surface or water surface) where oil should not be (or is not present in a baseline) in order to determine that there is an oil leak in the vicinity.

30 Claims, 11 Drawing Sheets

(56) References Cited

U.S. PATENT DOCUMENTS

| | | | | |
|---|---|---|---|---|
| 2011/0215936 A1* | 9/2011 | Ansari | ............... | G01M 3/002 340/584 |
| 2013/0147951 A1* | 6/2013 | Brown | ............... | H04N 5/33 348/143 |
| 2013/0286213 A1* | 10/2013 | Cetin | ............... | G01N 21/3504 348/164 |
| 2015/0192488 A1* | 7/2015 | Xu | ............... | B63G 8/001 702/38 |
| 2015/0317787 A1* | 11/2015 | Badawy | ............... | G06T 7/001 382/152 |
| 2016/0069743 A1* | 3/2016 | McQuilkin | ............... | A22B 5/007 356/416 |
| 2016/0238451 A1* | 8/2016 | Zeng | ............... | G01J 5/0014 |
| 2017/0089761 A1* | 3/2017 | McQuilkin | ............... | G01J 3/2823 |
| 2017/0336281 A1* | 11/2017 | Waxman | ............... | G01N 21/3504 |
| 2019/0003984 A1* | 1/2019 | Kester | ............... | G01J 3/2823 |

\* cited by examiner

INFRARED IMAGING SYSTEMS AND METHODS FOR OIL LEAK DETECTION

CROSS-REFERENCE

This patent application claims priority to U.S. Provisional Application No. 62/666,610 filed May 3, 2018, which provisional is incorporated herein by specific reference in its entirety.

BACKGROUND

Field

The present invention relates to systems and methods for detecting oil on surfaces. In some aspects, the present invention relates to infrared imaging systems and methods for detecting oil on solid surfaces or water surfaces.

Description of Related Art

Generally, it is problematic to have a petroleum fluid, such as oil, on any environmental surface or industrial surfaces where it does not belong. Leaks can occur in any component that stores or transports oil, which mandates oil leak detection. Environmental damage can be reduced or prevented with faster oil leak detection. Loss of oil from leaks also leaves a financial toll on the refinery. As a result, improvements in oil leak detection can be good for the environment and for reducing refinery or other facility processing petroleum products operating costs.

Therefore, it would be advantageous to be able to detect oil on a surface from an oil leak. Furthermore, it would be beneficial to be able to detect oil on solid surfaces and water surfaces.

SUMMARY

In some embodiments, a system for detecting an oil leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect an oil leak. The imaging analysis computer can be configured to detect oil on a surface where oil should not be (or is not present in a baseline) in order to determine that there is an oil leak in the vicinity.

In some embodiments, the system can be configured to obtain at least one baseline infrared image of a fixed field of view without oil being present. The baseline image can be updated over time prior to oil being detected on a surface in the fixed field of view. The baseline image can be an image from an imaging sensor, or a historical composite of pixel data from a plurality of baseline images over time. This allows for comparisons between images with no oil and images that have oil (e.g., suspected of having oil and being confirmed to have oil). Otherwise, when the current image has no oil, it is a no oil image. The protocol continues until an image with oil in it (e.g., oil on a surface) is obtained.

In some embodiments, the system can perform methods to analyze all pixels in the fixed field of view for changes from the at least one baseline infrared image to at least one subsequent infrared image. The changes can be in the pixel data for each pixel, such as changes in the pixel data that indicates changes in temperature of surfaces emitting the infrared light. That is, each pixel can be analyzed by analyzing the pixel data in a subsequent image and comparing that subsequent pixel data to the baseline pixel data. The analysis can include computationally processing the subsequent pixel data to determine a pixel value, such as a temperature for that pixel. The subsequent pixel value is compared to the baseline pixel value. The baseline pixel value can be a range of suitable pixel values, and may include a distribution of pixel values when the surface does not have oil. When the subsequent pixel value is within an allowable range of the baseline pixel value, the subsequent pixel value does not identify oil being present. However, when the subsequent pixel value is outside the allowable range of the baseline pixel value, then a determination is made as to whether or not the subsequent pixel value is indicative of oil being present.

In some embodiments, the system can perform methods to identify variable differences in temperatures for each pixel in the field of view between the at least one baseline infrared image and the at least one subsequent infrared image. The variable difference can be determined by assessing changes in pixel temperature value for a specific pixel (e.g., pixel location in the pixel array of the imaging device) from a baseline image to a subsequent image. However, when the subsequent pixel temperature value is outside the allowable range of the baseline pixel temperature value, then a determination is made as to whether or not the subsequent pixel value is indicative of oil being present.

In some embodiments, the system can identify one or more first pixels in the at least one subsequent infrared image having a first variable difference in temperature that is greater than an allowable variable difference in temperature for the one or more first pixels in the at least one subsequent infrared image compared to an allowable variable difference in temperature for the one or more first pixels in the at least one baseline infrared image. Accordingly, an allowable variable difference in temperature for each pixel can be determined, such as by recording the pixel data for each pixel (e.g., raw pixel data or temperature pixel data) and determining a distribution of pixel temperatures for each pixel. The distribution of pixel temperatures, based on historical pixel temperatures, can evolve as more pixel data is obtained for each pixel without oil. The distribution of pixel temperatures can be used to set a threshold temperature for a pixel temperature, where the threshold temperature sets an upper boundary for the allowable variable difference in temperature. The pixel temperature for each pixel in the subsequent image can be compared to the threshold temperature so as to be compared to the allowable variable difference in temperature. Then, pixels in the subsequent image having a pixel temperature greater than the threshold temperature are identified as being outside the allowable variable difference in temperature.

In some embodiments, the system can determine that there are one or more first pixels as being oil based on the first variable difference in temperature of the one or more first pixels being greater than the allowable variable difference in temperature of the one or more first pixels in the fixed field of view. As such, pixels having a pixel temperature that is greater than the threshold temperature can be identified as being oil due to having the first variable difference in temperature that is greater than the allowable variable difference in temperature for each pixel. The pixels having a pixel temperature that is outside or larger than the allowable variable difference in temperature can be identified as being oil.

In some embodiments, the system can generate an alert that identifies oil being present in the fixed field of view. This is done when one or more pixels are identified as having oil.

In some embodiments, the system can perform methods to identify one or more first pixels in the at least one subsequent infrared image having a first variable difference in temperature that is greater than a second variable difference in temperature for one or more second pixels in the at least one subsequent infrared image compared to the at least one baseline infrared image. The region of the first pixels can be analyzed to determine the temperature in the baseline image and the subsequent image, and then determine the change in temperature. Then, the region of the second pixels can be analyzed to determine the temperature in the baseline image and the subsequent image, and then determine the change in temperature. The change in temperature for the first pixels is compared to the change in temperature for the second pixels. When one group of pixels changes more than the other, then it can be determined that the surfaces of those pixels changed.

In some embodiments, the system can perform methods to determine the one or more first pixels as being oil and the one or more second pixels as being devoid of oil. This determination can be made based on the first variable difference in temperature of the one or more first pixels and the second variable difference in temperature of the one or more second pixels in the fixed field of view. When the change in the first pixels is larger than the change in the second pixels, there is an indication that oil is on the surface in the first pixels. Regions where the temperature variance is similar from the baseline infrared images to the subsequent images indicate that there hasn't been a change to the surfaces, and they do not have oil on them.

In some embodiments, the system can perform methods to generate an alert that identifies the presence of oil in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication.

In some embodiments, the system can perform methods to identify a one or more first pixels having a variable difference in temperature of from 0.5° C. to about 2° C. higher than one or more second pixels in the at least one subsequent infrared image. A variable difference in this range for a group of pixels can indicate the presence of oil. In some instances, the range may be from 0.25° C. to about 3° C. higher, 0.1° C. to about 2.5° C. higher, or other range indicative of oil being present.

In some embodiments, the system can perform a method for detecting viscosity of oil. The method can include: obtaining at least one baseline infrared image of a fixed field of view without oil being present; analyzing all pixels in the fixed field of view for changes from the at least one baseline infrared image to at least one subsequent infrared image; identifying variable differences in temperatures for each pixel in the field of view between the at least one baseline infrared image and the at least one subsequent infrared image; identifying one or more first pixels in the at least one subsequent infrared image having a first variable difference in temperature that is greater than an allowable variable difference in temperature for the one or more first pixels in the at least one subsequent infrared image compared to an allowable variable difference in temperature for the one or more first pixels in the at least one baseline infrared image; determining the one or more first pixels as being oil based on the first variable difference in temperature of the one or more first pixels being greater than the allowable variable difference in temperature of the one or more first pixels in the fixed field of view; determining an estimated viscosity of the oil in the one or more first pixels based on a comparison of the determined variable difference with viscosity data that correlates a variable difference in temperature with a viscosity, wherein the viscosity data includes a defined lower viscosity threshold value and a defined upper viscosity threshold value, wherein the estimated viscosity is interpolated between the lower viscosity threshold value and the upper viscosity threshold value; and generating a report that identifies the estimated viscosity for the oil in the fixed field of view.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
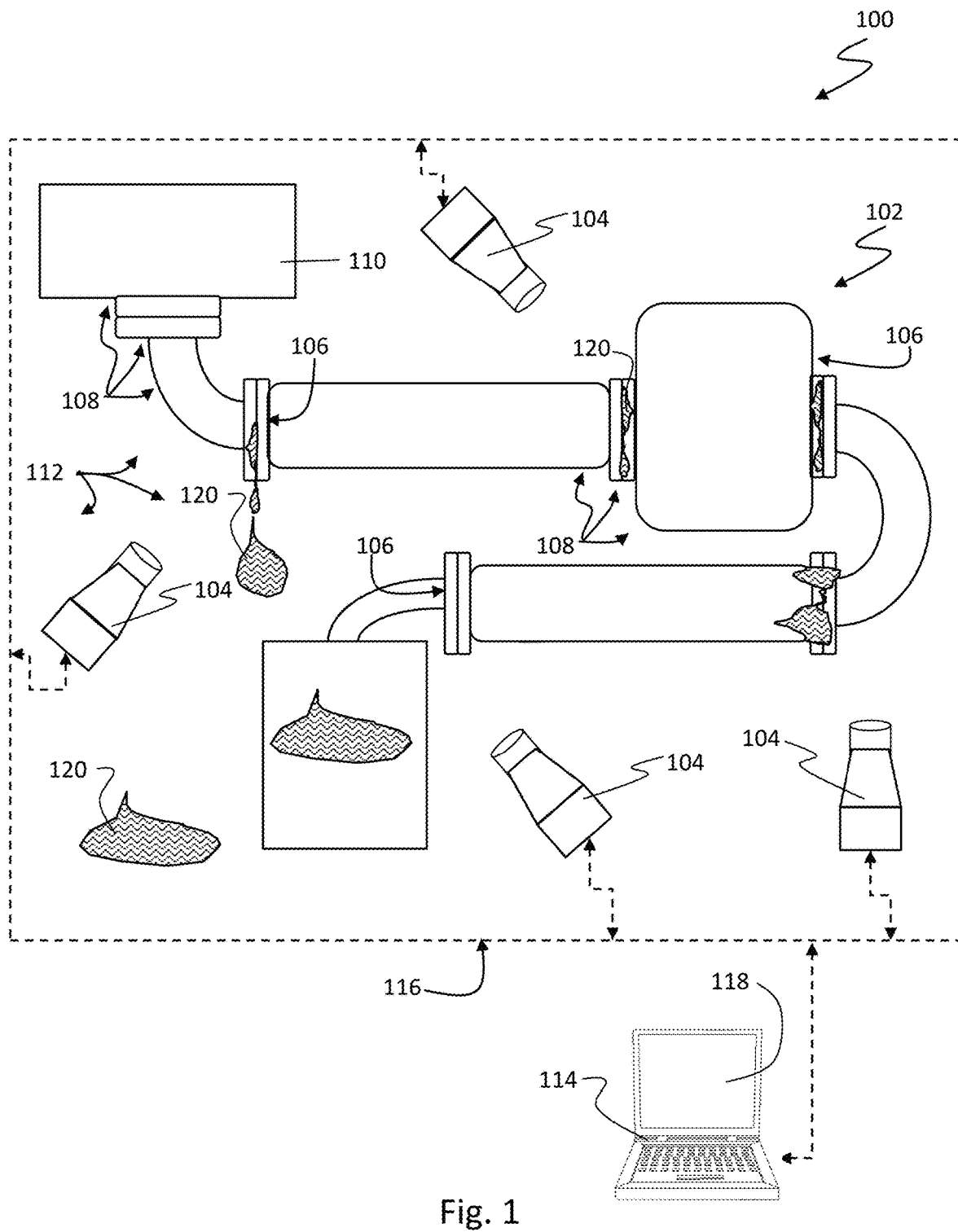
FIG. 1 includes a schematic diagram for a system for monitoring an environment with a set of infrared imaging sensors arranged for monitoring surfaces of components of an oil processing system and the surrounding area.

The features of the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology provides a system and method for detecting an oil leak that can include at least one infrared imaging sensor and an imaging analysis computer operably coupled with the at least one infrared imaging sensor. The imaging analysis computer can be configured to control any infrared imaging sensor and acquire infrared images therefrom at any reasonable rate and in any duration. The imaging analysis computer can be configured to analyze the infrared images in order to detect an oil leak. The imaging analysis computer can be configured to detect oil on a surface where oil should not be (or is not present in a baseline) in order to determine that there is an oil leak in the vicinity.

In some embodiments, the system can be an infrared monitoring system. The system can include a thermal imaging device (for example, an infrared (IR) imaging device) and a processor that are collectively configured to monitor and detect oil leaks. In some embodiments, the system may monitor a fixed field of view to detect oil on hard surfaces and separately to detect oil on water. If oil is detected, the system is configured to alert a user to the presence of the oil leak (or a potential oil leak). For example, by actuating an indicator (e.g., a visual alarm or an audio alarm) and/or by communicating to one or more users via an electronic communication channel (e.g., text message, email, telephone call, etc.). In some embodiments, an IR monitoring system (or at least an IR detector sensor or device) may be positioned under pumps, around flanges or connector pipes, etc. in a refinery. In some embodiments, an IR monitoring system may be used to detect oil on water, for example, in jetty areas or on an offshore oil terminal, around the terminal and fuel carrying ships to detect oil on water.

In some embodiments, a process (or a system) may start with a baseline IR image of the monitored field-of-view (FOV) without oil being present. The process may analyze all pixels in the FOV for changes from the baseline image to a subsequent image in order to detect oil based on variable differences in thermal temperatures of each pixel. Oil can be about 0.5 to about 2° C. warmer than surfaces that are not coated with oil; however, it should be recognized that this temperature difference variation may be different in different ambient conditions, different geographical locations, different humidity, or different times of the day, month, season or year. Also, each pixel is well characterized in the absence of oil, such as each pixel being related to surface data for a surface in the pixel. The well characterized pixel can have a range of suitable pixel values when there is not oil, so that the presence of oil shows a significantly different pixel value. The significantly different pixel value can be used to determine that there is now oil on the surface that is causing the different pixel value.

The process may also determine the type of oil and viscosity based on the difference in temperature variance as the thicker the oil the larger the variance in temperature from base surface (e.g., control region) to the oil (e.g., test region). A separate process may be used for oil on water compared to oil on solid surface. Some embodiments may include an option for rain detection which will trigger the use of the oil on water process as a dry surface changes to a wet surface.

FIG. 1 includes a schematic diagram for a system 100 for monitoring an environment 102 with a set of infrared imaging sensors 104 arranged for monitoring surfaces 106 of components 108 of an oil processing system 110 and the surrounding area 112. The system 100 also includes an image analysis computer 114 operably coupled to the set of infrared imaging sensors 104 through a network 116 (e.g., wired, wireless, optical or any network) represented by the dashed box. This allows for the infrared imaging sensors 104 to send infrared image data over the network 116 to the image analysis computer 114 for analysis.

While FIG. 1 shows four imaging sensors 104 positioned in the environment 102 around the oil processing system 100, the number of imaging sensors 104 included in the disclosed systems and/or operated in the disclosed methods may vary per embodiment. In some aspects, it may be desirable to achieve 360° coverage of the components 108 in the oil processing system 110 so as to detect oil 120 on any surface of a component 108 or in various locations to monitor the components 108 as well as the environment 102 (e.g., industrial environment, natural environment, etc.). In some aspects, systems 100 can include 4, 5, 6, 7, 8, 9, or 10 or more infrared imaging sensors 104 positioned around an oil processing system 110. As some components 108 of an oil processing system 110 may be of substantial height or length, in some aspects, it may be desirable to position a first set of imaging sensors 104 to provide coverage of a first area, and a second set of imaging sensors 104 to provide coverage for a second area. Depending on the length or height of the components being monitored, the number of imaging sensors 104 employed in various embodiments can vary substantially.

The imaging sensors 104 can be any infrared sensor. For example, the imaging sensor can be a long wave IR thermal machine vision camera (e.g., FLIR A615), which can include streaming an image frequency of 50 Hz (100/200 Hz) with windowing, an uncooled microbolometer, 640×480 pixels, 17 micron detector pitch, 8 ms detector time constant, and operational temperature over −20 to 150° C. The infrared imaging sensor can produce radiometric images with radiometric data for each pixel. In some aspects, the infrared imaging sensor can detect temperature differences as small as 50 mK, which provides accuracy even at longer distances. The infrared imaging sensor can provide 16 bit temperature linear output. The imaging sensor can provide the radiometric data as or about 307,200 pixels in infrared images with embedded temperature readings with the radiometric images. The imaging sensors 104 may include a weatherproof housing (e.g., wind and/or rain tight), which may be configured as spark proof or explosion proof housing. As such, the housing of the shown image sensors may be configured to be explosion proof as known in the art (e.g., solid anti-corroding aluminum construction, epoxy polyester powder paint, germanium window, dust proof, water proof, explosion proof, and optionally with a heater).

In some aspects, the radiometric data/images from the infrared sensor (e.g., radiometric IR camera) produces at least 16 bits of infrared data per pixel. These radiometric data/images can be used by the imaging analysis computer reading or recording the 'count' data (e.g., 16 bits) for each pixel, which when converted represents the thermal temperature of the pixel. This feature of using radiometric data/images provides more information for the present invention compared to IR images that are just JPEG images (e.g., non-radiometric data) from IR cameras that don't contain any thermal data and instead rely on image comparisons to detect change.

In some embodiments, discussion of images or infrared images is considered to be radiometric digital data from a long wave IR camera so that the algorithms process the radiometric digital data. The use of radiometry can use temperature measurement data for each pixel, where the radiometric measurements can be used for reading the intensity of thermal radiation, which can be used for temperature determination for each pixel. The radiometric thermal data for each pixel with pixel values correspond to the temperature of the scene. The radiometric data provides a precise temperature, which allows for external scene parameters to be compensated for emissivity (e.g., a measure of the efficiency of a surface to emit thermal energy relative to a perfect black body source) and window transmission to more accurately determine temperature. The user (or imaging analysis computer) may obtain temperature data from the radiometric data, as well as maximum temperatures, minimum temperatures, and standard deviations for user-defined regions (points of interest) for one or more pixels or a plurality of pixels.

Some radiometric IR cameras have the ability to compensate for variations in camera temperature. This allows operators of the systems to receive output from the radiometric IR cameras that has been stabilized and normalized, resulting in temperature-stable images or video. As a result, a scene with a given temperature can correspond to a certain digital value in the image or video, independent of the camera's temperature. In some aspects, it can be important to distinguish temperature measurements as surface infrared measurements because radiometric measurements can measure surface temperatures. Metals, and organic material (like people), are usually completely opaque, and radiometric measurements can be able to resolve their surface temperature. Remote temperature sensing of a surface relies on the ability to accurately compensate for surface characteristics, atmospheric interference, and the imaging system itself. The surface characteristics that influence temperature measurement are surface emissivity and reflectivity at the infrared spectral wavelengths, which can be considered in the algorithms and data processing described herein.

In some aspects, the imaging sensors 104 may be infrared imaging sensors that provide radiometric data/images. Infrared imaging sensors may capture wavelengths of light between at least 700 nanometers to 1 millimeter, and indicate the captured wavelengths in digital image information transmitted over the network 116 to the image analysis computer 114. Upon receiving the digital image information from the imaging sensors 104, the image analysis computer 114 may analyze the image information to determine temperature information for each pixel in the digital image. An operator of the system 100 may establish one or more warning levels or alert levels for one or more regions of interest (e.g., one or more pixels or combinations of adjacent pixels) within the digital image information of the digital images. The image analysis computer 114 may generate one or more warnings and/or alerts if the established alerting levels are exceeded. This may enable an operator to identify problems with the operation of the oil processing system 110, such as an oil leak, earlier than previously possible, resulting in less damage to the environment 102 or the oil processing system 110 and reduced production outages. Identifying and fixing oil leaks can be economically beneficial to the entity operating the oil processing system 110.

FIG. 1 also shows the imaging analysis computer 114 with a display 118 that can provide a user interface for monitoring images from the imaging sensors 104 and data obtained from computations of the digital image information in the images obtained during the monitoring protocols.

Figure 2:
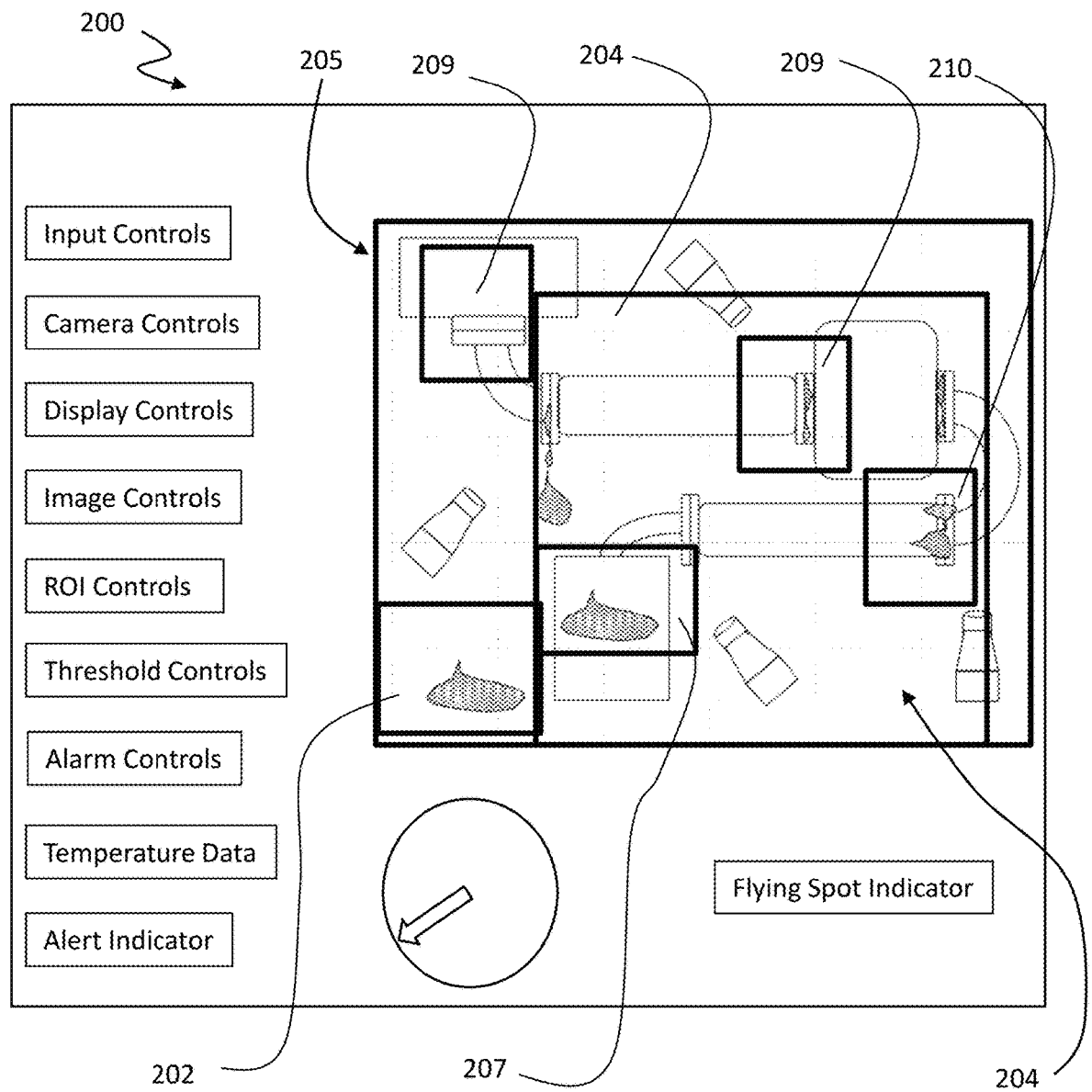
FIG. 2 shows a graphical user interface for monitoring the images obtained from the imaging sensors in order to determine whether or not oil is present in the field of view.

FIG. 2 shows a graphical user interface 200 for monitoring images 205 obtained from the imaging sensors 104 in order to determine whether or not oil is present in the field of view. The data processing protocols can be performed by the imaging analysis computer 114 so that visual information in the graphical user interface 200 can be provided on the display 118 for an operator of the system 100.

The images 205 can be parsed into environmental areas 202 and industrial areas 204. The image 205 can be parsed to show positive control areas 207 with oil leaks and/or negative control areas 209 without oil leaks or oil on a surface. Any of these may be labeled as a region of interest.

The images 205 can be parsed into one or more regions of interest 210 and identified by boundary indicators, such as a frame or window around each region of interest 210. The regions of interest 210 can be determined by the operator and input into the imaging analysis computer 114, or by the imaging analysis computer 114 analyzing prior selected regions of interest 210 and determining pixels commonly present in the regions of interest 210 to be a region of interest (e.g., based on historical data from images 205).

In some aspects, the image 205 may be received from a single imaging sensor 104, such as at any one of the imaging sensor 104 locations shown in FIG. 1. In some aspects, the image 205 may be generated by stitching together two or more images from two or more imaging sensors 104, such as any two or more of infrared imaging sensors or infrared imaging sensors combined with visible spectrum cameras. The image or video stitching of images from multiple imaging sensors may be performed by any of the methods known in the art. For example, in some aspects, OpenCV may be used to perform video stitching. Some aspects may utilize Video Stitch Studio by Video Stitch of Paris, France. Other aspects may use other methods.

The graphical user interface 200 can include input controls, camera controls, display controls, image controls, region of interest (ROI) controls, threshold controls, and alarm controls in order to allow the operator to control substantially any aspect of the monitoring protocol. The operator can: select which camera or combinations of cameras are being displayed by the input controls, select the field of view with the camera controls, select how the image from the camera looks on the display with the display controls, select the scaling or other image adjustments with the image controls, select various ROIs with the ROI controls, select temperature thresholds for one or more pixels or groups of pixels in the images with the threshold controls, and select one or more alarm levels and alarm display types (e.g., audible and/or visible) with the alarm controls. Over time, the data input into the graphical user interface 200 can be monitored and registered with the imaging analysis computer 114, and the input data can be analyzed to determine an automated operating protocol that is performed automatically by the imaging analysis computer 114 based on historical operations. The operator can adjust any operational parameter on the fly to update the automated operating protocol.

In some embodiments, the graphical user interface 200 also includes a scale indicator, a warning threshold control, and an alert threshold control. The scale indicator determines a graphical resolution of surface temperature ranges rendered within a region of interest of the image 205. For example, a smaller or narrower temperature range may provide an image that can communicate more fine detail between surface temperatures of the image (e.g., between a surface with or without oil).

The graphical user interface 200 can be operated by the warning and alert threshold controls being operated by an operator in order to set independent thresholds for warning indicators (e.g., possible oil) and alert indicators (e.g., oil spill detected). The example shown in FIG. 2 may provide a warning threshold at a temperature of 0.5° C. variation between different regions of interest, and an alert threshold at a temperature of 2° C. variation between different regions of interest.

The graphical user interface 200 can also include a temperature variance status indicator, which can be shown as a probability of oil (e.g., on a surface) in a region of interest. The oil presence status indicator can include a minimum, maximum, and average temperature variance (e.g., shown as probability of oil) currently detected within selected regions of interest 210, such as a known dry surface without oil and a problem area with prior oil leaks (e.g., flange junction, joints, etc.) The alert window shows alerts when the minimum, maximum, or average temperature variance (e.g., shown as probability of oil) shown in the status indicator have exceeded either of the warning or alert thresholds. Different flashing lights (e.g., different color), alarm sounds (e.g., different volume or sound pattern or word notifications via speakers), or combinations may be provided.

The graphical user interface 200 can also include a flying spot indicator. The flying spot indicator provides an indication of a temperature or probability of oil at a position (or pixel) in the image 205 that a pointing device may be hovering over.

Each region of interest 210 may include its own separate parameters, such as a scale indicator, warning and alert thresholds, temperature variance status, probability of oil indicator, and others. By selecting each of the regions of interest 210 individually, the display of the graphical user interface 200 may switch so as to display parameters corresponding to the selected region of interest. To edit one or more parameters for a region of interest, the region of interest is selected, for example, via a pointing device such as a mouse by clicking on the region of interest 210. The parameters corresponding to that selected region of interest are then displayed, and may be edited directly via the graphical user interface 200.

As discussed above, in some aspects, the image 205 may be generated by stitching together images captured by multiple imaging sensors 104. Graphical user interface 200 can be modified providing for the management of images from multiple imaging cameras 104. A graphical user interface 200 can include a camera selection field, region name field and link to region field. The camera selection field allows a user/operator to select between a plurality of imaging sensors, such as imaging sensors 104, that may be under control of, for example, the image analysis computer 114. When a particular imaging sensor 104 is selected in the camera selection field, the image 205 shown in the graphical user interface 200 may be received from the selected camera. In a particular embodiment, each region of interest shown in the image 205, such as the regions of interest 210, may be imaging sensor specific. In other words, the system 100, or more specifically the image analysis computer 114, may maintain separate parameters for each imaging sensor 104 utilized by the system 100. The separate parameters may include the number, names (see below) and configurations of regions of interest for each imaging sensor, warning and alert levels for each region of interest, and any linking between regions of interest, both within an image captured by one imaging sensor or across multiple images captured by multiple imaging sensors. A list of imaging sensors available for selection in the camera selection field may be generated based on configuration data providing the list of imaging sensors and indications of how imaging data may be obtained from the listed imaging sensors.

The region name field allows each region of interest 210, such as those with common oil leaks or known small leaks, to be named by an operator to allow for easy tracking and monitoring. The value in the region name field may change as each region of interest 210 is selected so as to display a name associated with the selected region of interest. Thus, region name field may be a read/write field, in that a current value is displayed but can be overwritten by an operator, with the overwritten value becoming the new current value. Regions that may not have oil can be named as controls so that the temperature variance is determined with known surfaces without oil.

Figure 6:
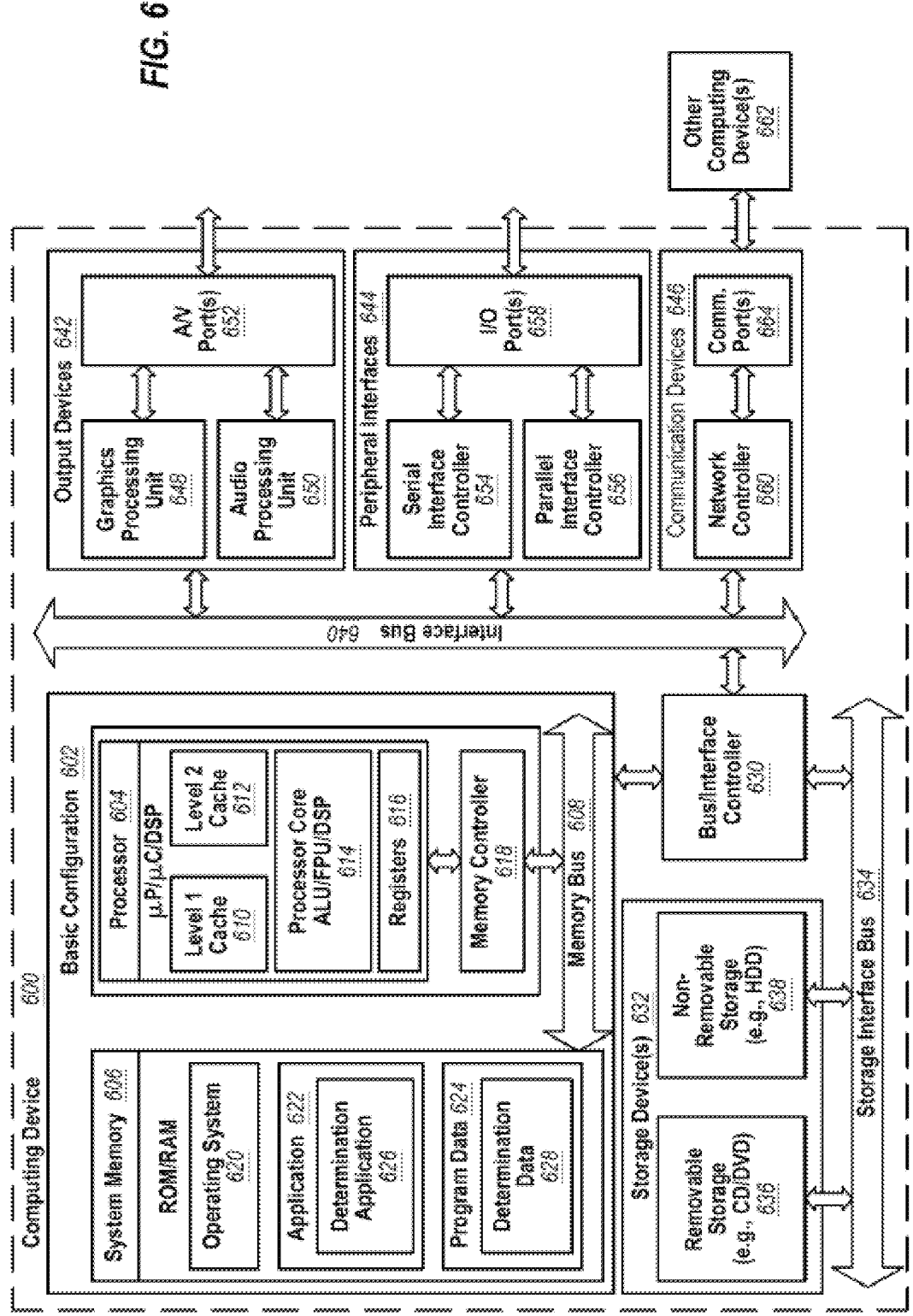
FIG. 6 shows an example computing device (e.g., a computer) that may be arranged in some embodiments to perform the methods (or portions thereof) described herein.

The image analysis computer 114 can be provided in various configurations from standard personal computers to cloud computing systems. FIG. 6, described in more detail below, provides an example of an image analysis computer 114, and includes the features of a standard computer. The image analysis computer 114 may communicate with the imaging sensors 104. For example, the image analysis computer 114 may be configured to transmit one or more configuration parameters to one or more of the imaging sensors 104, and command the imaging sensors 104 to capture one or more images. The image analysis computer 114 may further be configured to receive digital images from the imaging sensors 104, capturing different perspectives of a scene or environment.

The image analysis computer 114 may store instructions that configure the processor to perform one or more of the functions disclosed herein. For example, the memory may store instructions that configure the processor to retrieve an image from the imaging sensor(s) 104 and display the image on the electronic display 118. The memory may include further instructions that configure the processor to define one or more regions of interest in one or more images captured by one or more imaging sensors 104, and monitor temperatures, temperature variances, or possibility of oil being present in the regions of interest through successive images captured from the imaging sensor(s) 104. In some aspects, the memory may include instructions that configure the processor to set warning and/or alert threshold values for temperatures within one or more regions of interest defined in the image(s) of the scene or environment or defined or fixed fields of view of each camera, and generate warnings and/or alerts that oil may be present or is present when those threshold values are exceeded.

Figure 3:
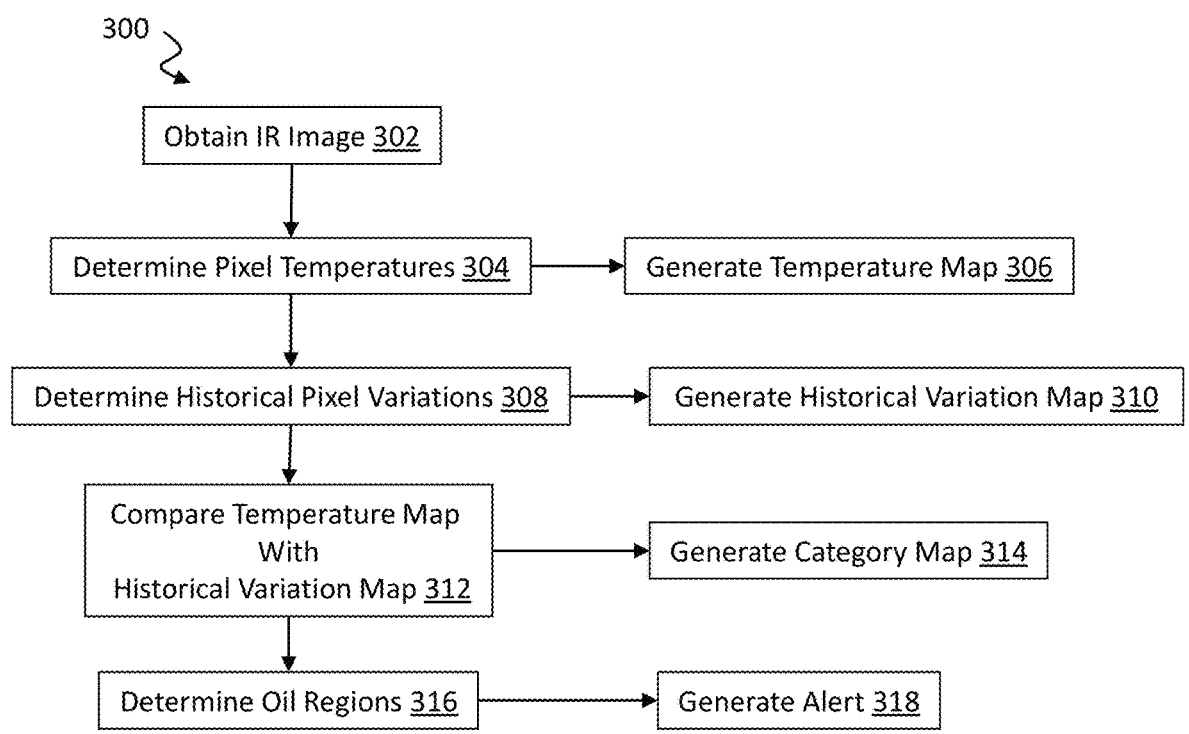
FIG. 3 is a flow chart of a process of one exemplary embodiment of the methods for detecting oil that can be performed by the embodiments of the systems disclosed herein.

FIG. 3 is a flow chart of a process 300 of one exemplary embodiment of the methods for detecting oil that can be performed by the embodiments of the systems disclosed herein. The process can include obtaining an IR image (step 302) from the image data from the imaging sensors 104, which can be stitched together to form an image 205. In some aspects, the image 205 may be generated based on image data from only a single imaging sensor, or more than two imaging sensors. The image 205 includes an array of pixels, each pixel having a pixel value. Each pixel value represents light captured at a position corresponding to the pixel's location within the pixel array. The field of view may be fixed, and thereby each pixel can have a defined pixel location in the array that corresponds to a surface of the field of view. The image 205 is then processed to determine pixel temperature values (step 304), which determines temperatures for each pixel based on the pixel values in the image 205. The process can create a temperature map for each image (step 306), where each pixel in the temperature map has a corresponding pixel temperature data. In some aspects, for each pixel value in the image 205, there is a corresponding temperature value in the temperature map. A temperature map can be generated for each IR image. The process can analyze the temperature values included in the temperature maps across at least two images, and preferably across a plurality of images over time, in order to identify a historical temperature variance for each pixel (step 308). This provides a range of historical temperatures, a historical temperature variance, over time to show how the temperature of each pixel can vary over time when there is no oil for the pixel. For example, a first pixel may represent a first surface, and the temperature of that surface can vary due to changing ambient temperatures, such as throughout the day, or across weeks, months, or seasons. The surface temperature is allowed to vary without there being an indication of oil, such as by varying within an allowable variation in temperatures. The historical variation of pixel temperatures for each pixel are aggregated to produce a historical temperature variation map (step 310) that includes an allowable range of temperatures for each pixel. The temperature variation map may include a value or range of values for each temperature variation for each pixel in the temperature map. As such, the historical variation map shows the historical temperature variation over a time period. The temperature map, for a current IR image, is then compared to the historical variation map, such as by each pixel in the temperature map being compared to the corresponding pixel in the historical variation map (step 312). The comparison results in the current temperature for a pixel being less than, the same, or greater than a value in the historical variation map to generate a category map (Step 314). When the current temperature for a pixel is greater than a value in the historical variation map, the pixel is categorized as abnormal (e.g., oil) in the category map. Otherwise, when the current temperature is less than or the same as the values in the historical variation map, the pixel is categorized as normal (e.g., not oil) Each value in the category map may indicate whether a corresponding temperature value in the temperature map is within a normal range or is categorized as abnormal with respect to the historical variation map, which includes data for each pixel for the allowable variation in temperature. When categorized as abnormal, the process can determine whether there is an oil region by linking adjacent pixels that are categorized as abnormal (step 316). After the category map is generated one or more abnormal regions are determined to be oil regions by processing the data. Based on the abnormal regions being oil regions, the process 300 can generate one or more alerts (step 318). While process 300 is serialized in the preceding discussion, one of skill in the art would understand that at least portions of process 300 may be performed in parallel in some operative embodiments.

Figure 4:
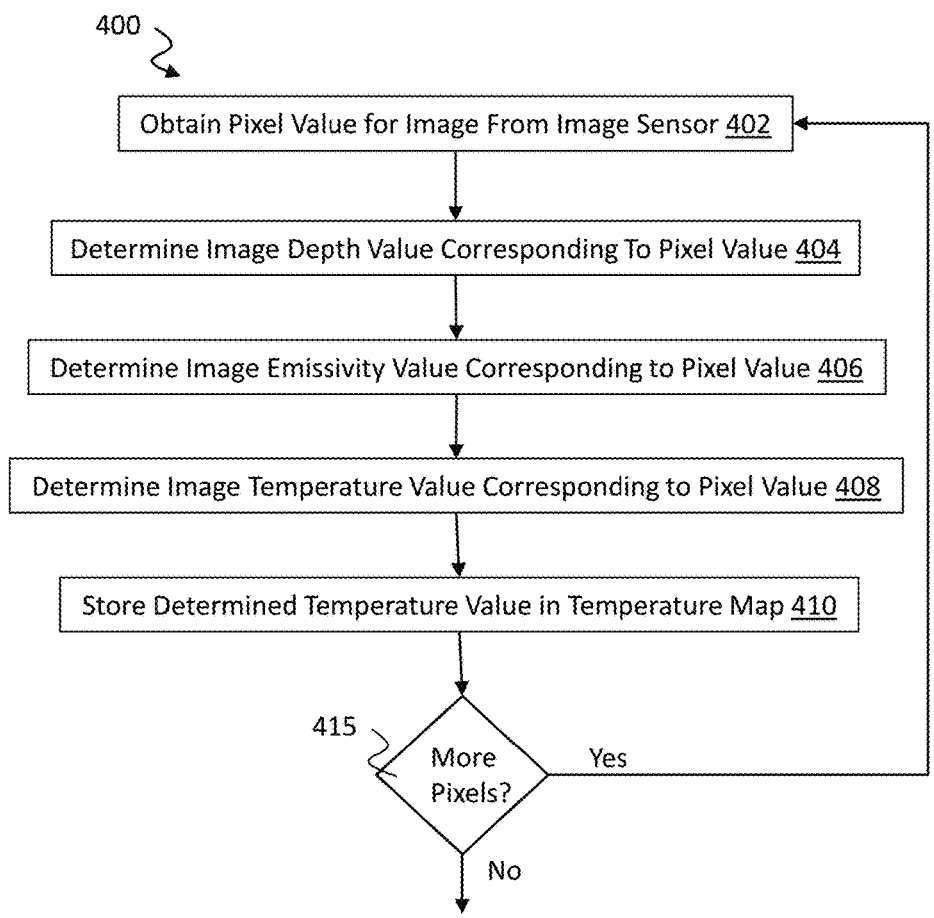
FIG. 4 is a flowchart of a process of one exemplary embodiment of a method for determining temperature values for pixels in an infrared image that can be performed by the embodiments of the systems disclosed herein.

FIG. 4 is a flowchart of a process 400 of one exemplary embodiment of a method for determining temperature values for pixels in an infrared image that can be performed by the embodiments of the systems disclosed herein. In block 402, a pixel value for an image from an infrared sensor is obtained. In some aspects, the image may be captured from one of the imaging sensors 104, discussed above with respect to FIG. 1. In some aspects, one or more of the imaging sensors 104 may record wavelengths of light between 700 nanometers and 1 mm (infrared wavelengths) along with intensity, brightness, or other light parameter, and represent the captured light as a digital image with each pixel having pixel data (e.g., pixel value). The pixel value received in block 402 may be one pixel value from an array of pixel values included in the captured image, where each pixel can include the pixel value In block 404, a depth value corresponding to the pixel value is obtained for the pixel (or each pixel). In some aspects, the depth value may be obtained from a depth map of the image. The depth map may be obtained, in some aspects, via a ranging device, such as a radio detection and ranging (RADAR) or light and radar or LIDAR device. In some aspects, the depth map may be obtained using structured light. The depth map may be obtained by known methods, and may be used due to the fixed field of view, where each pixel can be mapped with the distance to the surface in the fixed field of view that corresponds with the pixel.

In block 406, an emissivity value corresponding to the pixel value is obtained. In some aspects, the emissivity value may be based on a setting of the imaging sensor referenced in block 402. For example, in some aspects, the imaging sensor may be configured to capture objects of a given emissivity for each pixel. That is, a surface that corresponds to a pixel can have an emissivity value. This emissivity value may be used in block 406. In some aspects, an object database may include the emissivity of known objects. In some aspects, an emissivity value of an object being searched for in the image may be used. For example, in some aspects that may be imaging a steel pipe, an emissivity of steel may be used for the pixels that correspond with the steel pipe. This allows for the image to include a plurality of surfaces, and each pixel can correspond to a specific surface with the specific emissivity of that surface. As such, emissivity for various objects (e.g., from surface of the object) can be obtained, where the objects can be natural plants in the environment or concrete, gravel, metals, plastics or other industrial surfaces. The emissivity of different types of oil may also be obtained for the data analysis so that oil can be identified as well as the viscosity of the oil being identified. This can allow for determining the type of oil. This emissivity value may be configured by an operator in some aspects.

In block 408, a temperature value corresponding to the pixel value is determined based on the corresponding depth value and emissivity value. In some aspects, block 408 may include translation of a raw value from the imaging sensor into a power value. For example, in some aspects, the imaging sensor may provide imaging values in digital numbers (DNs). In some aspects, the power value may be determined using Equation 1:

Power=(Raw Signal Value−Camera Offset)/Camera Gain (1)

A signal value may be determined by Equation 2 below:

Signal=$K_1$×power−$K_2$, wherein:

$$K_1 = \frac{1}{\tau_{Atm} \times \text{Emissivity} \times ExtOptTransm},$$

$$K_2 = \frac{1 - \text{Emissivity}}{\text{Emissivity} \times AtmObjSig} + \frac{1 - \tau_{Atm}}{\text{Emissivity} \times \tau_{Atm} \times AtmObjSig} + \frac{1 - ExtOptTransm}{\text{Emissivity} \times \tau_{Atm} \times ExtOptTransm \times ExtOptTempObjSig}$$

$t_{ATM}$ is the transmission coefficient of the atmosphere between the scene and the camera, and is a function of spectral response parameters, object distance, relative humidity, etc.

ExtOptTransm is the External Optics Transmission and is the transmission of any optics (e.g. a protective window) between the object being imaged and the optics of the imaging sensor. The external optics transmission is a scalar value between zero and one. External optics that do not dampen the measurement have a value of one, and optics that completely sampan the measurement have a value of zero.

ExtOptTempOjbSig is the temperature of any optics (e.g., a protective window) between the object being imaged and the optics of the camera.

Emissivity is the emissivity of the object whose temperature is being determined.

To convert the signal calculated via Equation 2 into a temperature, some implementations may use Equation 3:

$$\text{Temperature} = \frac{B}{\log\left(\frac{R}{\text{Signal}} + F\right)} \quad (3)$$

where B, R, and F may be calibration parameters retrieved from the imaging sensor. The temperature may be in Celsius or Kelvin.

Also, a model for the total radiation $W_{tot}$ incident on the imaging sensor can be determined by the following Equation 4 by:

$W_{tot}=\varepsilon_{obj}\tau_{atm}\tau_{extopt}W_{obj}+(1-\varepsilon_{obj})\tau_{atm}\tau_{extopt}W_{amb}+(1-\tau_{atm})\tau_{extopt}W_{atm}+(1-\tau_{extopt})W_{extopt}$ (4)

In this equation, the $\varepsilon_{obj}$ is the emissivity of the object being imaged; $\tau_{Atm}$ and $\tau_{extopt}$ are the transmittance of the atmosphere and external optics, respectively; and $W_{obj}$, $W_{amb}$, $W_{atm}$, and $W_{extopt}$ are the radiation from the object, ambient sources, atmosphere, and external optics, respectively. The emissivity $\varepsilon_{obj}$ of the object is known or assumed prior to imaging the object. The transmittance $\tau_{atm}$ of the atmosphere is a function of the measured relative humidity ϕ and temperature Tat, of the atmosphere, and the measured distance $d_{obj}$ from the sensor to the object. The transmittance $\tau_{extopt}$ of the external optics is typically estimated during a calibration procedure that occurs prior to imaging the object.

Given the temperature $T_{obj}$ of the object, and the measured temperature $T_{amb}$ of the ambient sources, temperature $T_{atm}$ of the atmosphere, and temperature $T_{extopt}$ of the external optics; the radiation $W_{obj}$ from the object, radiation $W_{amb}$ from the ambient sources, radiation $W_{atm}$ from the atmosphere, and radiation $W_{extop}$ from the external optics, respectively, are calculated using Planck's law, which describes the radiation W emitted at wavelength λ by a black body at temperature T and is given by Equation 5.

$$W = \frac{2\pi hc^2}{\lambda^5} \frac{1}{\exp\left(\frac{hc}{\lambda k_B T}\right) - 1} \quad (5)$$

In Equation 5, h is the Planck constant, c is the speed of light in the medium (a constant), and $k_B$ is the Boltzmann constant.

Additionally, the IR camera maps the total radiation $W_{tot}$ to image intensities (i.e., pixel values) I=ƒ($W_{tot}$) under the radiometric response function ƒ of the camera, which is typically estimated during a calibration procedure that occurs prior to imaging the object.

The above model of the image formation process may be used to solve for the temperature $T_{obj}$ of the object, given all of the other variables, as follows. Given an image I of intensities acquired by the camera, the total radiation $W_{tot}$=ƒ$^{-1}$(I) (i.e., image intensity maps to incident radiation under the inverse of the camera response function). Then, solving equation 1 for the radiation $W_{obj}$ from the object yields Equation (6).

$$W_{obj} = \frac{W_{tot} - \left[ \begin{array}{c} (1-\varepsilon_{obj})\tau_{atm}\tau_{extopt}W_{amb} + \\ (1-\tau_{atm})\tau_{extopt}W_{atm} + (1-\tau_{extopt})W_{extopt} \end{array} \right]}{\varepsilon_{obj}\tau_{atm}\tau_{extopt}} \quad (6)$$

Then, Equation 6 is solved for the temperature $T_{obj}$ of the object as Equation 7.

$$T_{obj} = \frac{hc}{\lambda k_B} \frac{1}{\log\left(\frac{2\pi hc^2}{\lambda^5 W_{obj}} + 1\right)} \quad (7)$$

In block 410, the determined temperature value is stored in a temperature map, such as in step 306. The temperature map may be used as input for one or more of the processes discussed herein. A temperature map may be a data structure that stores temperature values for at least a portion of pixels in an image or region of interest. In some aspects, the temperature map may be stored in the memory of the image analysis computer 114.

Decision block 415 determines whether there are additional pixels to process in the image (or region of interest). If there are additional pixels, processing returns to block 402. Otherwise, processing continues in order to determine whether or not oil is present in any of the images.

Figure 4A:
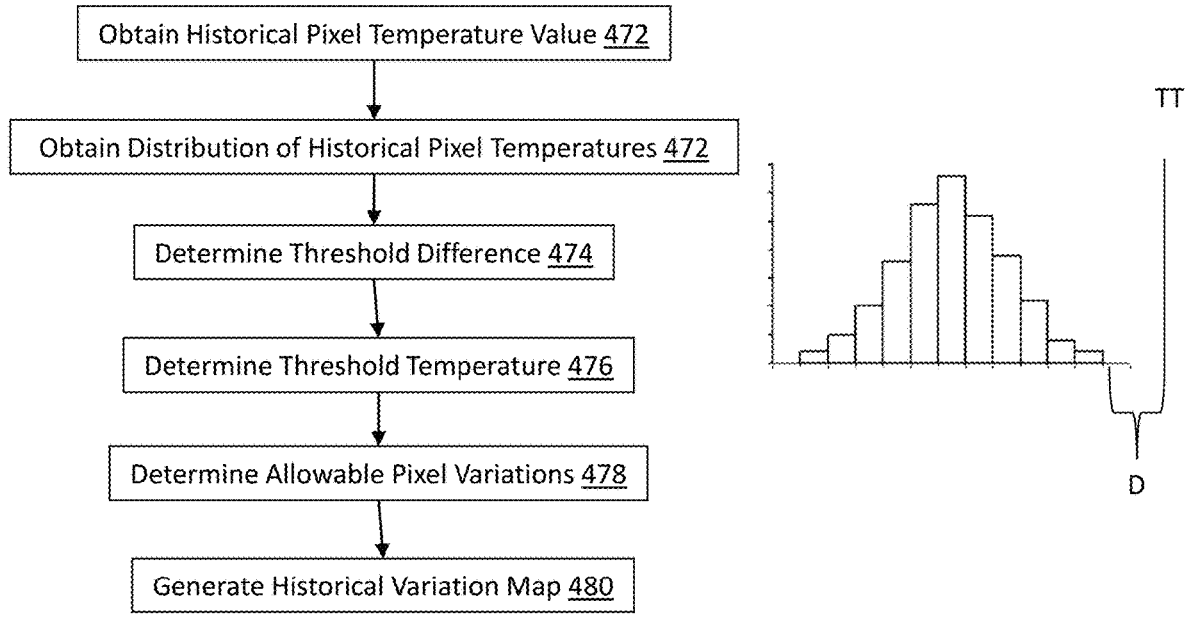
FIG. 4A is a flowchart of a process for generating a historical variation map.

FIG. 4A includes a flow chart of a process 470 of generating a historical variation map for the variation in temperatures for each pixel. The process 470 can include obtaining a plurality of historical pixel temperatures for a first pixel (step 472). The plurality of historical pixel temperatures for a first pixel are grouped in a distribution of historical pixel temperatures for the first pixel (step 474). A threshold difference (D) is determined based on the distribution of historical pixel temperatures (step 474), wherein the threshold difference D is the maximum allowed difference from the distribution of historical pixel temperatures that the pixel can have based on the historical temperature data for that pixel. The threshold difference D is then combined with the distribution of historical pixel temperatures to determine the threshold temperature (TT) (step 476). The threshold temperature TT is then combined with the distribution of historical pixel temperatures to determine an allowable difference in temperature, which allowable difference in temperature is set as the historical variance in temperature (step 478). The historical variation map can then be prepared to include the allowable difference in temperature or the historical variance for each pixel (step 480). The process can analyze the temperature values included in the temperature maps across at least two images, and preferably across a plurality of images over time, in order to identify a historical temperature variance for each pixel (step 308). This provides a range of historical temperatures, a historical temperature variance, over time to show how the temperature of each pixel can vary over time when there is no oil for the pixel. For example, a first pixel may represent a first surface, and the temperature of that surface can vary due to changing ambient temperatures, such as throughout the day, or across weeks, months, or seasons. The surface temperature is allowed to vary without there being an indication of oil, such as by varying within an allowable variation in temperatures. The historical variation of pixel temperatures for each pixel are aggregated to produce a historical temperature variation map (step 310) that includes an allowable range of temperatures for each pixel. The temperature variation map may include a value or range of values for each temperature variation for each pixel in the temperature map. As such, the historical variation map shows the historical temperature variation over a time period.

Figure 4B:
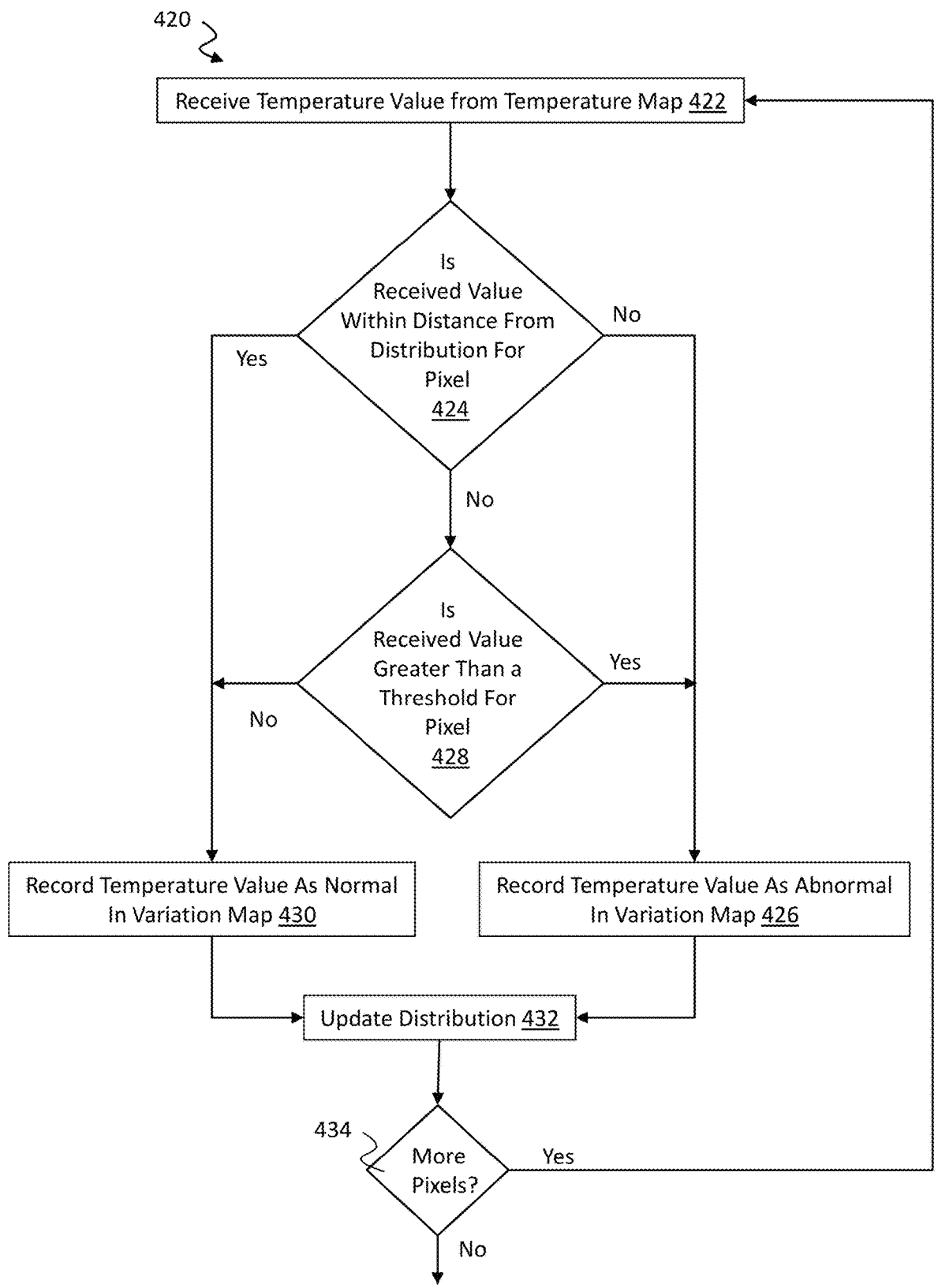
FIG. 4B includes a flowchart of a process of generating a category map for the variation in temperatures for each pixel.

FIG. 4B includes a flow chart of a process 420 of generating a category map for the current temperatures for each pixel based on the historical variation of each pixel. The historical variation map may indicate acceptable ranges of pixels that are within a normal range (e.g., not oil) and unacceptable ranges of pixels that are outside the normal range (e.g., oil). The pixels outside the normal range can be analyzed to determine whether or not they include oil.

In the illustrated embodiment, process 420 utilizes two different approaches to determine whether a pixel is within a "normal" temperature range. A first approach compares a temperature value to a statistical distribution of pixel temperatures based on historical values for the same pixel to determine a temperature variance (E.g., historical variation map). In most embodiments, a first pixel or first group of pixels is compared to the same first pixel or group of pixels to determine if the current temperature is within the historical temperature variation (e.g., not oil) or outside the historical temperature variation (e.g., oil). In some instances, this protocol can also include comparing a first pixel (or first group of pixels) to a second pixel (or second group of pixels) by comparing the pixel values (temperatures) as well as comparing the pixel variations (temperature variance) between two regions. Pixels with larger variances compared to the historical variation map over time can indicate the presence of oil. To the extent the temperature value is within a specified distance (e.g., threshold difference "D") from a distribution of temperature variances, the pixel may be considered within a "normal" range. However, in a scenario that includes surface temperatures changing gradually over time, such as from throughout the day for when oil contaminates a control region, process 420 may not detect a pixel that indicates a higher temperature rating using this first technique, as the higher temperatures may gradually become a new "normal", as the higher temperatures may change the nature of the distribution over time (e.g., over a day, week, month, season, year, etc.). To avoid this possibility, process 420 may compare the temperature value or temperature variation for a first pixel across multiple images to a threshold value that defines a maximum value of normal, regardless of historical values. By combining a comparison to historical values and to a threshold value, process 420 provides a robust characterization of a current temperature variation value as either "normal" or "abnormal."

The temperature (i.e., "counts") difference from the reference background has to be large enough that it triggers as a variation. This is where the sensitivity factor is considered in the algorithm, where the higher the sensitivity, the lower the difference (e.g., difference "D") between the current pixel temperature value and the reference background pixel temperature value is required in order to be considered as a potential oil pixel (e.g., abnormal). As such, the determination of an oil pixel based on the difference in temperature for a pixel compared to the allowable distribution of pixel temperature values is not a simple fixed-threshold relationship, but is based on whether the difference D falls outside the expected variance observed on that pixel over time. However, some embodiments use the fixed-threshold to determine normal pixels from abnormal pixels.

In block 422, a temperature value (e.g., temperature variance value) for at least one pixel is received from an imaging sensor or from the temperature map. In some aspects, the imaging sensor may capture infrared wavelengths of light and convert the captured light into digital data which forms an array of temperature values, with a pixel temperature value for each pixel. The pixel temperature value received in block 422 may be one temperature value (temperature variation) of one pixel in the array of temperature values (temperature variation) of a plurality of pixels.

Block 424 determines whether the pixel temperature value (e.g., temperature value variation) is within a specified distance (e.g., threshold difference "D") from a statistical distribution of pixel temperature values or temperature value variations for each pixel. The statistical distribution may be based on historical values of each pixel. In some aspects, the specified distance from the distribution is a Mahalanobis distance. For example, in some aspects, if the squared Mahalanobis distance is greater than the inverse chi squared cumulative distribution function at a specified probability (e.g. 0.99), then it is within the distribution. Otherwise, it is outside of the distribution in some aspects.

In some aspects, block 424 may make different determinations. For example, in some aspects, block 424 may determine whether the temperature value (e.g., temperature variation for pixel) is within a distance representing 90%, 95%, or 99% of the statistical distribution. If the received value is not within the specified distance from the distribution, process 420 moves to block 426, which marks the pixel as abnormal in a pixel map (e.g., category map).

If the temperature value is within the specified distance, process 420 moves from decision block 424 to decision block 428, which determines whether the pixel temperature value is above a threshold value (e.g., a set threshold temperature value, which may or may not be the same as the temperature of the threshold difference D. This determines whether the temperature variation is greater than a threshold temperature variation for each pixel. The threshold value referenced in block 428 may be based on operator configured information, as a set value, or determined over time based on historical information. The configured information may be specific to an image (generated by a single imaging sensor or generated by stitching together data from multiple imaging sensors), or a region of interest within an image. If the temperature value is above the threshold value, process 420 moves to block 426, which marks the pixel temperature value as abnormal (e.g., in category map) as discussed above.

Otherwise, if the temperature value is within the distance D from the distribution for the pixel in step 424 or is not greater than the threshold value in step 428, process 420 moves to block 430, which records the temperature value as normal in the category map.

Due to the historical nature of the data that defines the distribution and thresholds for temperature, the distribution can be updated with the new data, such as when the new data is marked as normal. The distribution is not updated when the pixel temperature value is identified as being abnormal. Also, the distribution can be any distribution (e.g., normal Gaussian) and the measurement to the difference D may be an average, mean, center, edge, or other defined part of the distribution.

After the distribution is updated in block 432, process 420 moves to decision block 434, which determines if there are more pixels in an image to process. If there are, process 420 returns to block 422 and processing continues. If there are no more pixels, processing may continue for determining whether there is oil on a surface in the images.

Figure 4C:
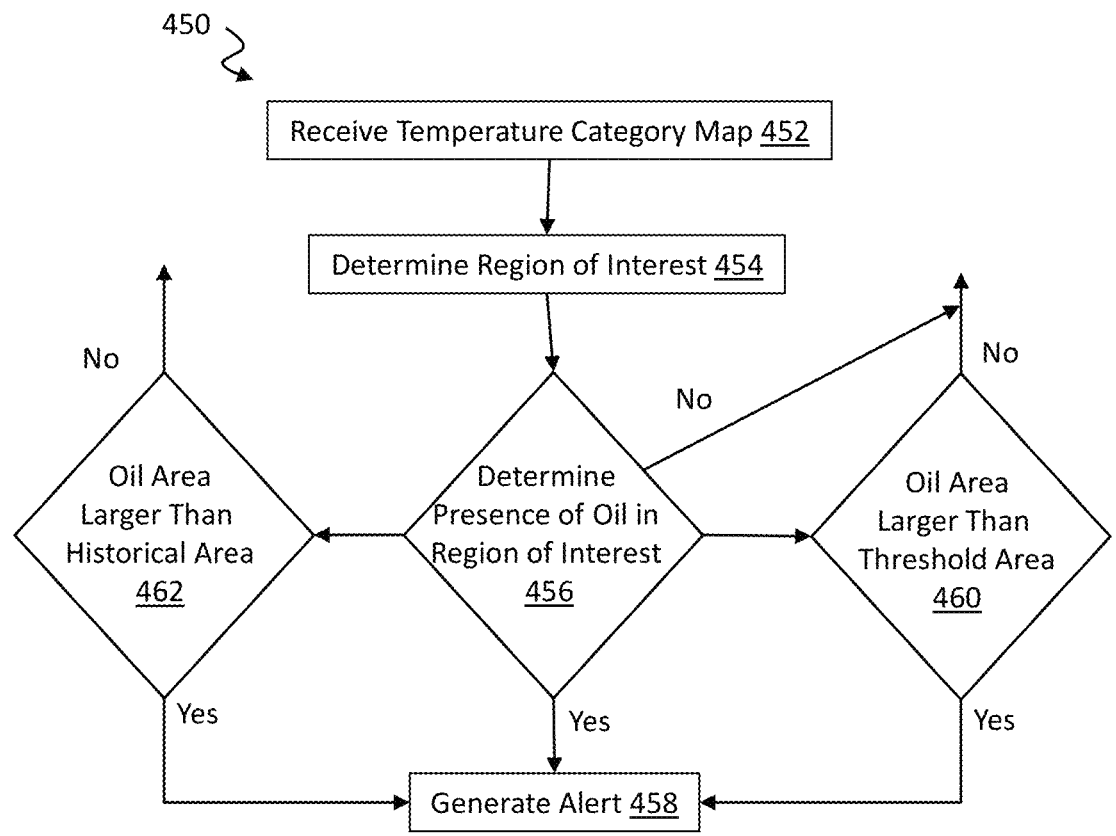
FIG. 4C includes a flowchart of a process of generating an alert based on an abnormal region of pixels that are identified as being a region of oil.

FIG. 4C includes a flow chart of a process 450 of generating an alert based on an abnormal region of pixels that are identified as being a region of oil. In block 452, the temperature category map is received indicating normal and abnormal temperature values for each pixel within the image. For example, in some aspects, a category map may represent a matrix or two dimensional array of true/false or 1/0 values, with a true/1 value in a position of the category map indicating a pixel located at a corresponding position of the image is abnormal, while a false/0 value in a position of the category map indicates a temperature or temperature variance located at a corresponding pixel position of the image is normal. In some aspects, the meaning of these values may be reversed. In some aspects, the category map received in block 452 may be generated by process 420, discussed above with respect to FIG. 4B.

In block 454, a region of interest with one or more abnormal pixels within the image is determined. The region of interest may be determined in some aspects, by selecting one or more pixels of a previously identified regions of interest. A region of interest can be any region in the environment that is more susceptible to having oil from an oil leak. The region of interest may also be selected in real time based on an area of abnormal pixels that are adjacent to each other. In some aspects, the region of interest may encompass a subset of all the pixels in an image. In some aspects, the region of interest may be defined by an operator, for example, by operating a pointing device such as a mouse or touch screen, as well as interacting with the graphical user interface 200 to identify a portion of the infrared image 205. A region of abnormal pixels may be identified by connecting a region of contiguous or near contiguous abnormal pixels.

Decision block 456 determines whether oil was determined to be present in the region of interest, where the oil can be a region of abnormal pixels or region of interest in block 454. If no oil in the region of interest was identified, then process 450 continues processing. If an oil region was identified in block 456, then process 450 can make different decisions. One decision is that if there is any oil detected in the images, then the process moves to block 458 and an alert is generated. However, the system can be configured to compare any detected oil (e.g., pixel having oil) to historical values for the pixel(s) or to threshold values before generating an alert.

In one option, when oil is determined to be present in the pixels of a region of interest (e.g., when the region of interest is partially or entirely oil), the size of the area of the region of interest (e.g., size of the area of pixels identified to be oil) is determined and compared to a threshold area size as shown block 460. When the size of the area of the oil is greater than a threshold area size, then the process 450 generates the alert 458. When the size of the area of oil is less than a threshold area size, then the alert is not generated and monitoring for oil or monitoring the size of the region of oil continues.

In another option, when oil is determined to be present in the pixels of a region of interest (e.g., when the region of interest is partially or entirely oil), the size of the area of the region of interest (e.g., size of the area of pixels identified to be oil) is determined and compared to a historical area size as shown block 462. The historical area size can include an average of historical area sizes for a particular oil region or averaging across particular oil regions. For example, the oil region may be small with a low rate of increasing area size, the protocol determines whether the current oil region is above the historical area sizes or a size that is too different (e.g., difference, or change in size) from the historical area size. When the size of the area of the oil is greater than this historical area size or a value to much higher than the historical area, then the process 450 generates the alert 458. When the size of the area of oil is within the historical area size range or close to the historical area size (e.g., within a distance/value from the average or range), then the alert is not generated and monitoring for oil or monitoring the size of the region of oil continues.

Also, a size of the identified oil region can be compared to a predetermined percent of a region of interest. In some aspects, the percent of the region of interest may be 1%, 2%, 3%, 4%, 5%, 6%, 7%, 8%, 9%, 10%, 15%, 20%, 25%, 30%, 33%, 35%, 50%, 75%, or 100% of the region of interest. If the area of the oil region is larger than the predetermined percent, process 450 moves to block 458 where an alert is generated.

Some aspects of block 458 may utilize different conditions for generating an alert than those described. For example, in some aspects, an absolute size of the oil region (number of adjacent pixels) may be used to determine if an alert should be generated, either to the exclusion of or in conjunction with the size of the oil region relative to a size of the region of interest.

In some embodiments, the process may calculate an aggregated "normal" temperature (e.g., temperature variation across images) for pixels within the abnormal region (e.g., oil region) and an aggregated temperature variation within the region of interest. If a distance between the aggregated normal temperature variance and aggregated measured temperature variance is above a threshold, an alert may be generated in some aspects. For example, some aspects may include selecting a nominal or normal temperature variation from the distributions for each of the pixels in the abnormal region. These nominal values may then be aggregated. Similarly, the measured temperatures and temperature variations within the abnormal region may be separately aggregated. This aggregate of measured temperatures or temperature variations represents an aggregated variance for the abnormal region. If the measured variance is substantially (represented by the threshold) above a normal variance for the abnormal region, an alert may be generated. This technique considers a situation where none of the pixels within the abnormal region may be above a warning or alert threshold, and thus, no alert is generated based on these thresholds. Additionally, the abnormal oil region may be a relatively small portion of the region of interest, such that no alert is generated. However, given the number of pixels (within the abnormal oil region) that are above their nominal or normal points, (i.e. the variance of the abnormal oil region), there may be cause for concern such that an alert is proper.

In some aspects, generating an alert may include displaying a message on an electronic display, such as a system control console. In some other aspects, generating an alert may include sending an email, text message, or writing data to a log file, or any combination of these.

In some embodiments, a system for detecting an oil leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect an oil leak. The imaging analysis computer can be configured to detect oil on a surface where oil should not be (or is not present in a baseline) in order to determine that there is an oil leak in the vicinity.

In some embodiments, the system can be configured to obtain at least one baseline infrared image of a fixed field of view without oil being present. The baseline image can be updated over time prior to oil being detected on a surface in the fixed field of view. The baseline image can be an image from an imaging sensor, or a historical composite of pixel data from a plurality of baseline images over time. This allows for comparisons between images with no oil and images that have oil. In some instances, the at least one baseline image is the historical variation map, or the one or more images used to prepare the historical variation map. The at least one baseline infrared image can be a single image when representing the baseline for each pixel without oil. However, the at least one baseline image can be a plurality of images, or a composite prepared from a plurality of images so as to have the distribution thereof (e.g., historical variation map). The at least one baseline infrared image can provide the threshold difference and threshold temperature as well as the allowable pixel variations.

In some embodiments, the system can perform methods to analyze all pixels in the fixed field of view for changes from the at least one baseline infrared image to at least one subsequent infrared image. The changes can be in the pixel data for each pixel, such as changes in the wavelength of the infrared light that indicates changes in temperature of surfaces emitting the infrared light.

In some embodiments, the system can perform methods to identify variable differences in temperatures for each pixel in the field of view between the at least one baseline infrared image and the at least one subsequent infrared image. The variable difference can be determined by assessing changes in a specific pixel (e.g., pixel location in the pixel array of the imaging device) from a baseline image to a subsequent image.

In some embodiments, the system can perform methods to identify one or more first pixels in the at least one subsequent infrared image having a first variable difference in temperature that is greater than an allowable variable difference in temperature for the one or more first pixels in the at least one subsequent infrared image compared to an allowable variable difference in temperature for the one or more first pixels in the at least one baseline infrared image. This protocol can be performed as described in connection to FIG. 4B. Here, the one or more first pixels are identified because they have pixel temperature values that are identified as being abnormal because they are outside the allowable variable difference by being greater than the threshold difference by being above the threshold temperature. The identified pixels that are abnormal can be appropriately marked in the category map.

In some embodiments, the system can perform methods to determine the one or more first pixels as being oil based on the first variable difference in temperature of the one or more first pixels being greater than the allowable variable difference in temperature of the one or more first pixels in the fixed field of view. The pixels that are determined to be oil can be analyzed in accordance with the protocol of FIG. 4C. In some embodiments, the system can perform methods to generate an alert that identifies oil being present in the fixed field of view. The generation of the alert and protocol thereof can also be performed in accordance with the protocol of FIG. 4C.

In some embodiments, the system can perform methods to identify one or more first pixels in the at least one subsequent infrared image having a first variable difference in temperature that is greater than a second variable difference in temperature for one or more second pixels in the at least one subsequent infrared image compared to the at least one baseline infrared image. The region of the first pixels can be analyzed to determine the temperature in the baseline image and the subsequent image, and then determine the change in temperature. Then, the region of the second pixels can be analyzed to determine the temperature in the baseline image and the subsequent image, and then determine the change in temperature. The change in temperature for the first pixels is compared to the change in temperature for the second pixels. When one group of pixels changes more than the other, then it can be determined that the surfaces of those pixels changed.

In some embodiments, the system can perform methods to determine the one or more first pixels as being oil and the one or more second pixels as being devoid of oil. This determination can be made based on the first variable difference in temperature of the one or more first pixels and the second variable difference in temperature of the one or more second pixels in the fixed field of view. When the change in the first pixels is larger than the change in the second pixels, there is an indication that oil is on the surface in the first pixels. Regions where the temperature variance is similar from the baseline infrared images to the subsequent images indicate that there hasn't been a change to the surfaces, and they do not have oil on them.

In some embodiments, the system can perform methods to generate an alert that identifies the presence of oil in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication.

In some embodiments, the system can perform methods to identify a one or more first pixels having a variable difference in temperature of from 0.5° C. to about 2° C. higher than one or more second pixels in the at least one subsequent infrared image. A variable difference in this range for a group of pixels can indicate the presence of oil. In some instances, the range may be from 0.25° C. to about 3° C. higher, 0.1° C. to about 2.5° C. higher, or other range indicative of oil being present.

In some embodiments, the imaging analysis computer is configured to monitor the fixed field of view to detect oil on a solid surface. The solid surface can be selected from foliage, wood, plant, soil, rock, concrete, metal, composite, ceramic, plastic, rubber, or combination thereof. However, other solid or non-liquid (e.g., non-water) surfaces may be monitored for oil detection. The system can be configured to monitor certain solid surfaces, such as in an oil processing system or components thereof with or without monitoring the environment surrounding the oil processing system or components thereof. For example, the system can acquire emissivity, reflectivity, or other surface characteristics that impact absorption, reflection, emission or other optical light property for surfaces in the fixed field of view. The system can acquire emissivity, reflectivity, or other surface characteristics that impact absorption, reflection, emission or other optical light property for surfaces having oil or for oil surfaces. Then, computations can be performed to determine whether there is oil on a surface in the fixed field of view of the baseline and/or subsequent images.

In some embodiments, the imaging analysis computer is configured to monitor the fixed field of view to detect oil on water. The water surface can be analyzed for movement, wave, or stillness, which can be parameterized and included in the calculations. The water surface can also be analyzed for color, which can be parameterized and included in the calculations. The system can be configured to monitor certain water surfaces, such as in or around an oil processing system or components thereof. For example, the system can acquire emissivity, reflectivity, or other water surface characteristics for a particular body of water that impact absorption, reflection, emission or other optical light property for the water surface in the fixed field of view. The system can acquire emissivity, reflectivity, or other surface characteristics that impact absorption, reflection, emission or other optical light property for water surfaces having oil or for oil surfaces. Then, computations can be performed to determine whether there is oil on a water surface in the fixed field of view of the baseline and/or subsequent images.

Figure 5A:
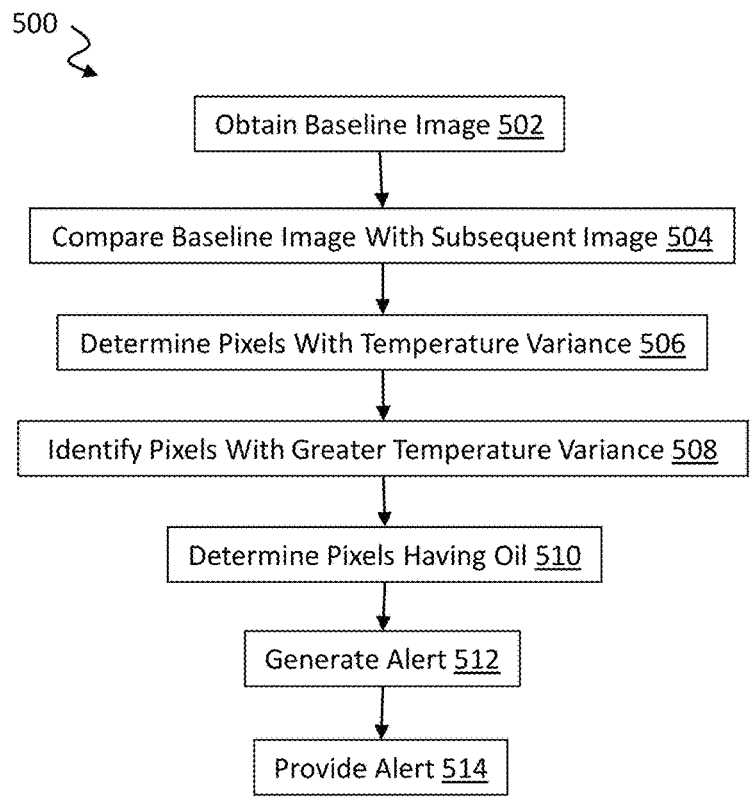
FIG. 5A illustrates a method of detecting an oil leak.

FIG. 5A illustrates a method 500 of detecting an oil leak. The method may be performed with a system described herein having at least one infrared imaging sensor and an imaging analysis computer. Step 502 includes obtaining at least one baseline infrared image of a fixed field of view without oil being present. Step 504 includes analyzing some or all pixels in the fixed field of view for changes from the at least one baseline infrared image to at least one subsequent infrared image. Step 506 can include identifying variable differences in temperatures for each pixel in the field of view between the at least one baseline infrared image and the at least one subsequent infrared image. Step 508 can include identifying a one or more first pixels in the at least one subsequent infrared image having a first variable difference in temperature that is greater than allowable based on the distribution of temperature variances in the at least one subsequent infrared image compared to the at least one baseline infrared image (e.g., greater than the threshold difference from the distribution or greater than the threshold temperature). Step 510 can include determining the one or more first pixels as being oil, and optionally determining one or more second pixels as being devoid of oil based on the variable difference in temperature of each pixel in the fixed field of view. Step 512 can include generating an alert that identifies the presence of oil in the fixed field of view.

In some embodiments, the method can be performed to include providing the alert from the imaging analysis computer (step 514). This can include any of the following: providing the alert by actuating an audible and/or visible indicator; providing the alert by transmitting the alert to a remote device; and/or providing the alert as an audible or visible communication.

Figure 5B:
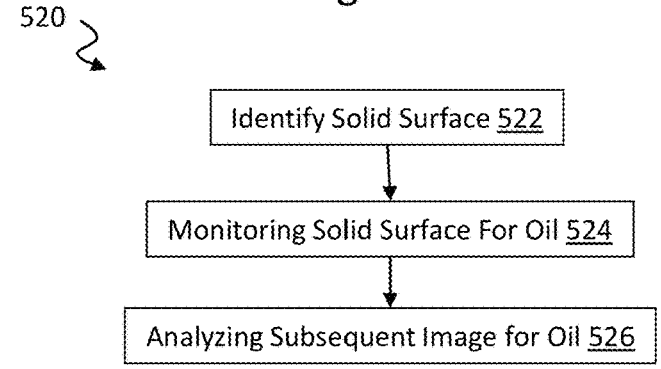
FIG. 5B includes a method for detecting oil on a surface.

FIG. 5B includes a method 520 for detecting oil on a surface. The method 520 can include analyzing a baseline image for a solid surface (step 522), and identification of pixels associated with the solid surface. Step 524 can include monitoring the fixed field of view to detect oil on a solid surface. Step 526 can include analyzing a subsequent image for oil on the solid surface. In order to analyze a surface for oil in any image, the method may include obtaining an emissivity value corresponding to the pixel value for a pixel. In some aspects, the emissivity value may be based on a setting of the imaging sensor. For example, in some aspects, the imaging sensor may be configured to capture objects of a given emissivity. This emissivity value may be used during the monitoring and analyzing. In some aspects, an object database may include emissivity of known objects, which can be utilized in the methods. In some aspects, an emissivity value of an object being searched for in the image may be used. For example, in some aspects that may be imaging a steel pipe, an emissivity of steel may be used. As such, emissivity for various objects (e.g., from surface of the object) can be obtained, where the objects can be natural plants or objects (e.g., foliage, wood, plant, soil, rock) in the environment or concrete, gravel, metals, composites, plastics, rubber or other industrial surfaces. The emissivity of different types of oil may also be obtained for the data analysis so that oil can be identified as well as the viscosity of the oil being identified. This can allow for determining the type of oil. This emissivity value may be configured by an operator in some aspects.

Figure 5C:
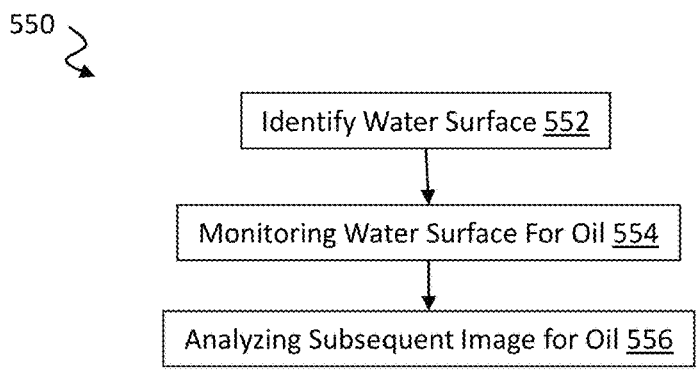
FIG. 5C includes a method for detecting oil on a water surface.

FIG. 5C includes a method 550 for detecting oil on a water surface. The method 550 can include analyzing a baseline image for a water surface (step 552), and identification of pixels associated with the water surface. Step 554 can include monitoring the fixed field of view to detect oil on a water surface. Step 556 can include analyzing a subsequent image for oil on the water surface. The water surface can be analyzed for movement, wave, or stillness, which can be parameterized and included in the calculations. The water surface can also be analyzed for color, which can be parameterized and included in the calculations. The system can be configured to monitor certain water surfaces, such as in or around an oil processing system or components thereof. For example, the system can acquire emissivity, reflectivity, or other water surface characteristics for a particular body of water that impact absorption, reflection, emission or other optical light property for the water surface in the fixed field of view. The system can acquire emissivity, reflectivity, or other surface characteristics that impact absorption, reflection, emission or other optical light property for water surfaces having oil or for oil surfaces. Then, computations can be performed to determine whether there is oil on a water surface in the fixed field of view of the baseline and/or subsequent images.

In some aspects, the method can determine whether or not the water has surface elevation fluctuations, and compensate for the surface elevation fluctuations during the analysis of the pixels in the fixed field of view. In some aspect, the method can determine whether or not the water has areas of reflected light, and compensate for the areas of reflected light during the analysis of the pixels in the fixed field of view.

Figure 5D:
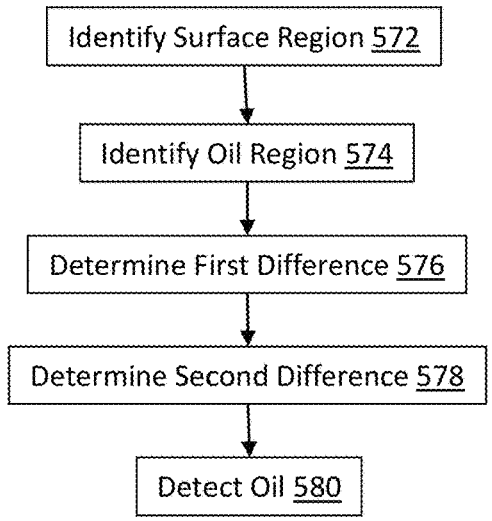
FIG. 5D shows a method for detecting oil on a surface.

FIG. 5D shows a protocol 570 for detecting oil on a surface. The protocol can include identifying a surface region in the fixed field of view that is a surface, wherein the surface region has a surface temperature (Step 572). Step 574 can include identifying an oil region in the fixed field of view that is oil by having a variable difference in temperature that is greater than the surface region from the at least one baseline infrared image to the at least one subsequent infrared image. The protocol 570 may also determine that the oil region in the fixed field of view in the at least one baseline infrared image and in the at least one subsequent infrared image have a first difference (Step 576). Step 578 can include determining the surface region in the fixed field of view in the at least one baseline infrared image and in the at least one subsequent infrared image as having a second difference. Step 580 can include determining that the second region in the fixed field of view is oil when the first difference is greater than the second difference.

In some embodiments, the methods can include recording historical information of a plurality of infrared images of the fixed field of view received from the at least one infrared imaging sensor. Such historical information can include the images or image data for a number of images over a time period. The historical information can be used for establishing baselines and controls without oil so that the changes in the images when oil is present can be detected.

In some embodiments, the methods can include providing the alert on a display device. Such a display device can show images selected from: an infrared image from the at least one infrared sensor; a schematic of locations of the at least one infrared sensor; or a location of an alert.

In some embodiments, the methods can include recalibrating the system, which can be scheduled or as needed or desired. Once the system is recalibrated, the methods can obtain an updated at least one baseline infrared image after the recalibration.

In some embodiments, the methods are performed such that the fixed field of view includes a hard surface. However, weather can impact whether or not the hard surfaces have water or any wetness. As such, the method can include: determining that it is raining in the fixed field of view; and monitoring the fixed field of view to detect oil on water, such as when water is on a surface. Accordingly, the database may include data for emissivity or other water parameters when on a surface, such as a known surface type.

Figure 5E:
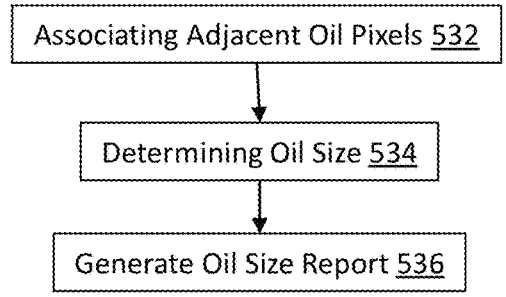
FIG. 5E shows another method for detecting oil on a surface.

FIG. 5E shows another method 530 for detecting oil on a surface. The method 530 can include: associating adjacent first pixels to identify an oil region (step 532); determining a size of the oil region (step 534); and generating an oil region size report that identifies the size of the oil region based on the associated adjacent first pixels (step 536). The method 530 may also include associating adjacent first pixels to identify an oil region; determining an area of the oil region; comparing the area of the oil region with a threshold area size; and generating the alert once the oil region has an area that is at least the size of the threshold size, wherein the threshold area size is a defined value or a percentage of a region of interest.

Figure 5F:
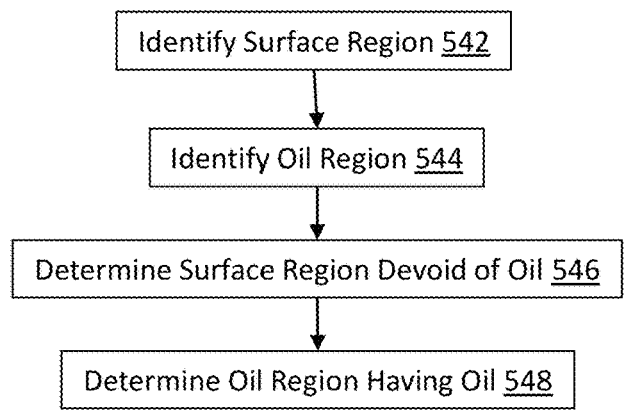
FIG. 5F show another method for determining that a surface has oil.

FIG. 5F shows a protocol 540 for detecting oil on a surface. The protocol can include identifying a surface region in the fixed field of view that is a surface, wherein the surface region has a surface temperature (Step 542). Step 544 can include identifying an oil region in the fixed field of view that is oil by having a variable difference in temperature for each pixel that is greater than the allowable variable difference in temperature for the surface region from the at least one baseline infrared image to the at least one subsequent infrared image. The protocol 540 can also determine the surface region in the fixed field of view in the at least one baseline infrared image as being devoid of oil, wherein the surface region has a pixel temperature value that is within the allowable variable difference in temperature for each pixel (step 546). The protocol 540 can also determine the oil region in the fixed field of view in the at least one subsequent infrared image as having oil, wherein the oil region having the first variable difference in temperature that is greater than the allowable variable difference in temperature for each pixel.

In some embodiments, the methods can include: accessing a memory device that includes thermal data for one or more surfaces in the fixed field of view; obtaining the thermal data for the one or more surfaces in the fixed field of view; and computing with the thermal data for the one or more surfaces in the fixed field of view during the analysis of the pixels in the fixed field of view.

In some embodiments, the methods can include: accessing a memory device that includes distance data for one or more surfaces in the fixed field of view from the at least one infrared imaging sensor: obtaining the distance data for the one or more surfaces in the fixed field of view; and computing with the distance data for the one or more surfaces in the fixed field of view during the analysis of the pixels in the fixed field of view.

In some embodiments, the methods can include determining a relative humidity; and computing with the relative humidity as data during the analysis of the pixels in the fixed field of view.

In some embodiments, the imaging analysis computer is configured to: associate adjacent first pixels to identify an oil region; determine a size of the oil region; and generate an oil region size report that identifies the size of the oil region based on the associated adjacent first pixels. In some aspects, the imaging analysis computer is configured to: associate adjacent first pixels to identify an oil region; determine an area of the oil region; compare the area of the oil region with a threshold area size; and generate the alert once the oil region has an area that is at least the size of the threshold size, wherein the threshold area size is a defined value or a percentage of a region of interest. This protocol can be performed as described herein.

In some embodiments, the imaging analysis computer is configured to: determine whether or not the water has surface elevation fluctuations; and compensate for the surface elevation fluctuations during the analysis of the pixels in the fixed field of view. In some aspects, the imaging analysis computer is configured to: determine whether or not the water has areas of reflected light; and compensate for the areas of reflected light during the analysis of the pixels in the fixed field of view. This protocol can be performed as described herein.

In some embodiments, the memory device includes thermal data for one or more surfaces in the fixed field of view, wherein the imaging analysis computer is configured to: obtain the thermal data for the one or more surfaces in the fixed field of view; and compute with the thermal data for the one or more surfaces in the fixed field of view during the analysis of the pixels in the fixed field of view. In some aspects, the memory device includes distance data for one or more surfaces in the fixed field of view from the at least one infrared imaging sensor, wherein the imaging analysis computer is configured to: obtain the distance data for the one or more surfaces in the fixed field of view; and compute with the distance data for the one or more surfaces in the fixed field of view during the analysis of the pixels in the fixed field of view. In some aspects, the imaging analysis computer is configured to: determine a relative humidity; and compute with the relative humidity during the analysis of the pixels in the fixed field of view. This protocol can be performed as described herein.

In some embodiments, the imaging analysis computer is configured to obtain the at least one baseline infrared image by: acquiring a series of infrared images of the fixed field of view; analyzing pixel data of each infrared image of the series to determine a pixel temperature for each pixel for each infrared image; determining a range of pixel temperatures for each pixel without oil being present in the fixed field of view across the series of infrared images of the fixed field of view; and setting the allowable variable difference in temperature to include the determined range of pixel temperatures for each pixel without oil. In some aspects, the imaging analysis computer is configured to obtain the at least one baseline infrared image by: performing a statistical analysis of the range of pixel temperatures for each pixel without oil being present across the series of infrared images of the fixed field of view to determine an allowable distribution of pixel temperatures for each pixel; and setting the at least one baseline infrared image so that each pixel includes the allowable distribution of pixel temperatures. This protocol can be performed as described herein.

In some embodiments, the at least one baseline infrared image is a model of each pixel with the allowable distribution of pixel temperatures for each pixel, wherein the model of pixel is obtained by: determining a distribution of the pixel temperatures for each pixel without oil being present across the series of infrared images; identifying a maximum pixel temperature that is greater than the distribution of pixel temperatures by a first difference; and setting the first difference from the distribution to indicate absence of oil for each pixel. This protocol can be performed as described herein. Each pixel can have its own model based on the historical temperature values.

In some embodiments, the imaging analysis computer is configured to: compare each pixel temperature in the one or more subsequent infrared images with the model of each pixel with the allowable distribution of pixel temperatures; determine a difference between each pixel temperature in the one or more subsequent infrared images and the model of each pixel; determine whether the difference is greater than a threshold difference, when the difference is greater than the threshold difference, determine that the pixel is an oil pixel, or when the difference is less than the threshold difference, determine that the pixel is a surface pixel. In some aspects, the imaging analysis computer is configured to: continuously update the model in real time; and continuously compare new infrared images with the model in real time.

In some embodiments, the imaging analysis computer is configured to: determine a standard deviation of the distribution of the pixel temperatures for each pixel without oil being present across the series of infrared images; and set the threshold difference as being a defined difference from the standard deviation.

Figure 7:
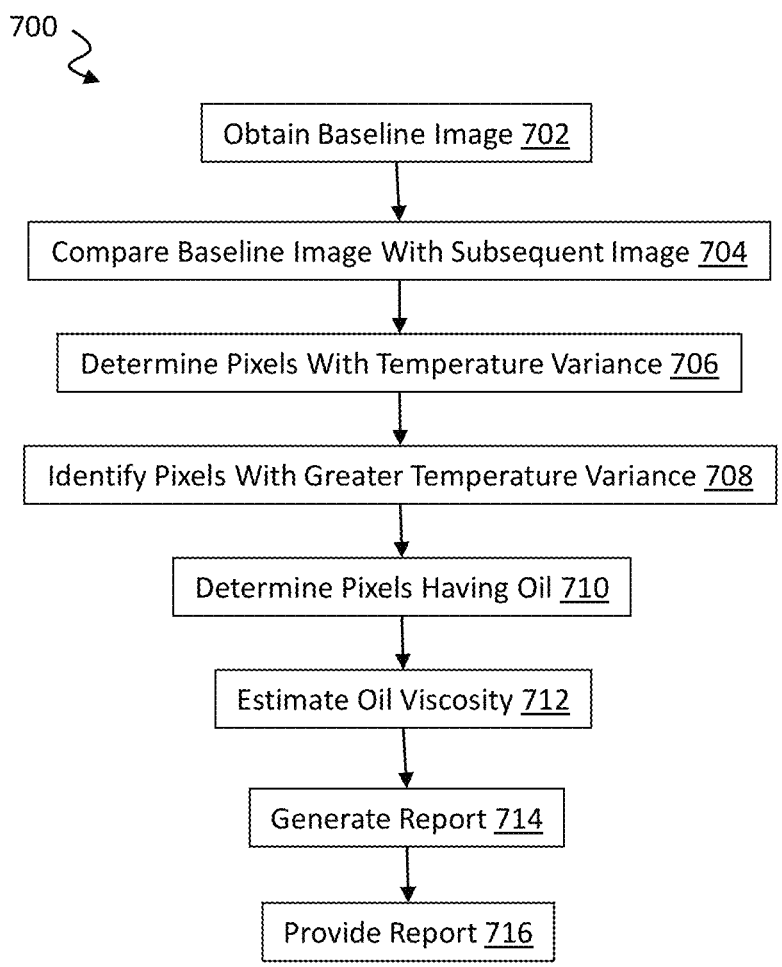
FIG. 7 illustrates a method of determining viscosity of oil.
Figure 8:
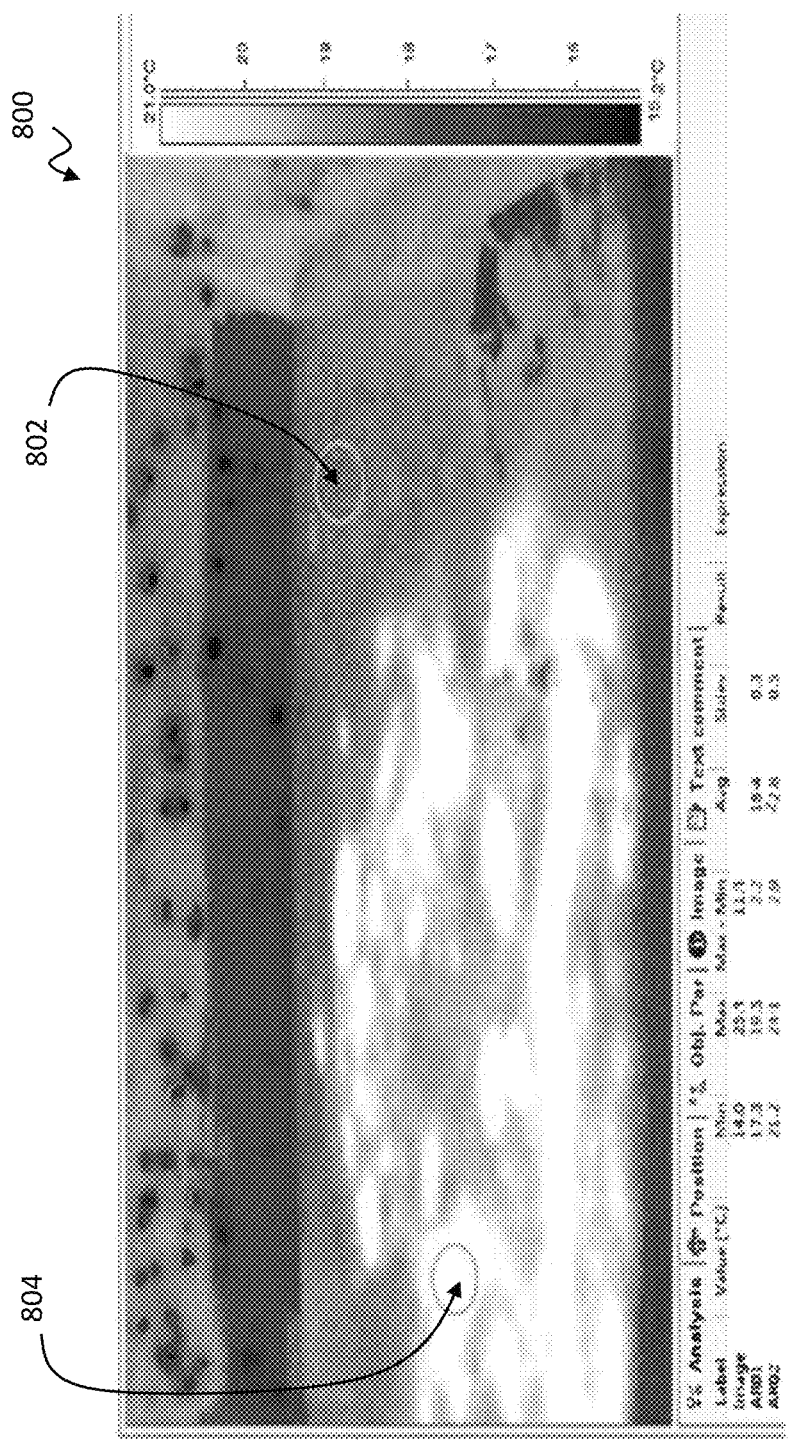
FIG. 8 provides an example infrared image that shows a control region without oil on the surface having a first temperature and an oil region with oil on the surface having a second temperature.

In some embodiments, the system can perform a method 700 for detecting viscosity of oil as shown in FIG. 7. The method can include: obtaining at least one baseline infrared image of a fixed field of view without oil being present (step 702); analyzing all pixels in the fixed field of view for changes from the at least one baseline infrared image to at least one subsequent infrared image (step 704); identifying variable differences in temperatures for each pixel in the field of view between the at least one baseline infrared image and the at least one subsequent infrared image (step 706); identifying one or more first pixels in the at least one subsequent infrared image having a first variable difference in temperature that is greater than a second variable difference in temperature for one or more second pixels in the at least one subsequent infrared image compared to the at least one baseline infrared image (step 708); determining the one or more first pixels as being oil and the one or more second pixels as being devoid of oil based on the variable difference in temperature of each pixel in the fixed field of view (step 710); determining an estimated viscosity of the oil in the one or more first pixels based on a comparison of the determined variable difference with viscosity data that correlates a variable difference in temperature with a viscosity (step 712), wherein the viscosity data includes a defined lower viscosity threshold value and a defined upper viscosity threshold value, wherein the estimated viscosity is interpolated between the lower viscosity threshold value and the upper viscosity threshold value (step 712); and generating a report that identifies the estimated viscosity for the oil in the fixed field of view (step 714). The report can then be provided (step 716). In some aspects, the method may further include: determining a type of oil having the estimated viscosity; and generating the report to identify the type of oil FIG. 8 provides an example infrared image 800 that shows a control region 802 without oil on the surface having a first temperature and an oil region 804 with oil on the surface having a second temperature. At some baseline time point, oil region 804 was devoid of oil. As such, the variable temperature difference between the control region 802 and the oil region 804 from a baseline image to a subsequent image can be used to detect oil on the surface. The difference between the control region 802 and the oil region 804 is over 2° C.

In some embodiments, the methods can be operated by software. The software manages the network connections on a 1 to 1 basis with each IR camera to monitor camera performance, assigns correct algorithms to each camera depending on the solution assigned to the camera, monitors alerts from cameras, displays an alert and related IR images for all cameras, assigns CPUs to cameras depending on performance requirements and records historical information as determined by the refinery subsystems. The hardware to run the refinery infrared management system can include a multi-CPU racked based system that is scalable to allow for additional cameras added to each solution. The hardware, memory and disk management system can be scoped and selected based on the final numbers of IR cameras.

The system can contain a series of LCD display screens to show overall management of the infrared system, highlight alert locations as they are triggered, allow for the display of the IR image from any IR camera, and display operational views of each system such as the tank level management, thermal component operations, gas and oil leak detection. The display system can utilize the graphical displays from the relative refinery unit to show locations of IR cameras, IR images and IR alerts locations.

The system can be configured to provide real time alerts for oil leaks on any surface as designated by the protocols described herein. In dry applications without water, the system can include an A615 long wave IR camera. In wet or marine applications with water, the system can include a cooled long wave IR camera.

The present invention can provide many improvements in oil leak detection. Some features of the system are: monitors key components and processes for oil leaks (e.g., pumps, pipes, flanges and other connections); detects oil on any surface including solids or water; detects oil types based on viscosity; provides real time alerts and images of suspected leaks; if an alert is triggered due to oil being present, the camera can be recalibrated once oil is removed to ensure setting of the correct baseline image; the system communicates with all cameras to receive radiometric data from images as well as IR variables (temperature, humidity, etc.) from the camera that can be used in calculations and algorithms; the system records and stores 1 image per second for up to 12 hours or more; an alert will set off an alarm, such as flash the icon on the system graphical display to designate leak location and at user option display the IR image; the system has the ability to set tolerances of sensitivity to minimize false alerts; and provides an average frame rate of 30 frames/sec.

In some embodiments, the methods collect a series of images and analyzes the images to determine whether one or more abnormal pixels exist in the same pixel location for some duration. If a specific pixel or region of pixels only shows as abnormal for a few frames or not for a long enough duration, it can be determined that the abnormal pixels were an aberration or a non-oil entity. Such a short term duration of an abnormal pixel can be flagged as a potential false alarm.

In some embodiments, the system can be programmed with instructions to perform the methods described herein. The system can also be programmed to track all leak detected locations. Accordingly, once an area or location is tagged as an oil leak area, the system can update the database so that this area is monitored as part of a specifically monitored group. The known leak locations can be routinely monitored and analyzed for oil leak data, such as source of leak, leak rate, leak volume, leak viscosity, or other information. The sensitivity of known leak pixels may be programmed so that system responds to changes in the temperature appropriately, such as when there are small leaks setting a higher threshold until the leak is fixed so that an increase in the leak rate or other worsening of the leak can be identified. Another example is setting a lower threshold in an area without any leak history. Accordingly, the system can be programmed to accommodate desired operability. Additionally, the known leak locations can be tagged for maintenance and maintenance planning. The system can provide real time updates on the status of a known leak location, whether or not actively leaking. When leaking, the system can provide reports for any increases in leak rate or any other leak change over a period of time. These reports can include analytical data for the analyzed leak to provide any of the leak parameters described herein in real time or over defined time periods.

In some embodiments, the system can be programmed to automatically change flow rate of oil within oil conduits or other oil containing or moving components. For example, oil is often carried in pipes, through pumps, and across junctions, any of which may develop a crack or opening that may leak oil. Once an oil-containing component is identified as a source of the oil leak, the system can automatically regulate the oil amount or oil flow in that component. For example, the system may generate an alert of an oil leak, analyze for the location of the oil leak, and then modulate the oil-containing component to regulate the oil, such as by shutting off flow to the leak location. For another example, the system can automatically acute pumps, valves, or other equipment to modulate, reduce or stop the flow of oil to the oil leak location. In another example, the computer can enable an oil valve shutdown for oil leaks that exceed a leak volume, rate or duration, which may be set by the operator to automatically control the valves.

In one embodiment, the type of oil is determined by the location of the oil leak being from a region having a known type of oil. For example, a lubricant conduit will leak that lubricant alone. As such, mapping the leak to a component having a known type of oil can result in knowing the viscosity of that type of.

For this and other processes and methods disclosed herein, the operations performed in the processes and methods may be implemented in differing order. Furthermore, the outlined operations are only provided as examples, and some operations may be optional, combined into fewer operations, eliminated, supplemented with further operations, or expanded into additional operations, without detracting from the essence of the disclosed embodiments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (tP), a microcontroller (tC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A system for detecting an oil leak, comprising:
at least one infrared imaging sensor;
an imaging analysis computer operably coupled with the at least one infrared imaging sensor, wherein the imaging analysis computer is configured to:
obtain at least one baseline infrared image of a fixed field of view without oil being present;
determine a distribution of baseline temperature values for each pixel of the at least one baseline infrared image;
determine an allowable variable difference in temperature that is a range of temperatures within a defined distance from the distribution of the baseline temperature values for each pixel of the at least one baseline infrared image;
obtain at least one subsequent infrared image of the fixed field of view;
determine a subsequent temperature value for each pixel of the at least one subsequent infrared image;
analyze all pixels in the fixed field of view for changes from the distribution of baseline temperature values of each pixel in the at least one baseline infrared image to the subsequent temperature value of each pixel in the at least one subsequent infrared image;
identify variable differences in temperatures for each pixel in the field of view between the at least one baseline infrared image and the at least one subsequent infrared image;
identify one or more first pixels in the at least one subsequent infrared image having a first variable difference in temperature that is outside the range of temperatures of the allowable variable difference in temperature for the one or more first pixels in the at least one subsequent infrared image compared to the allowable variable difference in temperature for the one or more first pixels in the at least one baseline infrared image;
determine the one or more first pixels as being oil based on the first variable difference in temperature of the one or more first pixels being greater than the allowable variable difference in temperature of the one or more first pixels in the fixed field of view; and
generate an alert that identifies oil being present in the fixed field of view.

2. The system of claim 1, wherein the imaging analysis computer is configured to provide the alert by:
actuating an audible indicator;
actuating a visible indicator;
showing the alert on a display device; or
transmitting the alert to a remote device.

3. The system of claim 1, wherein the imaging analysis computer is configured to monitor the fixed field of view to detect oil on a solid surface.

4. The system of claim 3, wherein the solid surface is selected from foliage, wood, plant, soil, rock, concrete, metal, composite, ceramic, plastic, rubber, or combination thereof.

5. The system of claim 1, wherein the fixed field of view includes at least one region of water,
wherein the imaging analysis computer is configured to monitor the fixed field of view to detect oil on the region of water.

6. The system of claim 1, wherein the imaging analysis computer is configured to:
identify a surface region in the fixed field of view that is a surface, the surface region having a surface temperature for each pixel; and
identify an oil region in the fixed field of view that is oil by having a variable difference in temperature for each pixel that is greater than the allowable variable difference in temperature for the surface region from the at least one baseline infrared image to the at least one subsequent infrared image.

7. The system of claim 6, wherein the imaging analysis computer is configured to:
determine the surface region in the fixed field of view in the at least one baseline infrared image as being devoid of oil, the surface region having the allowable variable difference in temperature for each pixel; and
determine the oil region in the fixed field of view in the at least one subsequent infrared image as having oil, the oil region having the first variable difference in temperature that is greater than the allowable variable difference in temperature for each pixel.

8. The system of claim 1, wherein the imaging analysis computer is configured to:
associate adjacent first pixels to identify an oil region;
determine a size of the oil region; and
generate an oil region size report that identifies the size of the oil region based on the associated adjacent first pixels; or
compare the area of the oil region with a threshold area size and generate the alert once the oil region has an area that is at least the size of the threshold size, wherein the threshold area size is a defined value or a percentage of a region of interest.

9. The system of claim 1, wherein the imaging analysis computer is configured to perform at least one of the following:
determine whether or not the water has surface elevation fluctuations and compensate for the surface elevation fluctuations during the analysis of the pixels in the fixed field of view;
determining that it is raining in the fixed field of view and monitoring the fixed field of view to detect oil on water;
determine whether or not the water has areas of reflected light and compensate for the areas of reflected light during the analysis of the pixels in the fixed field of view;
obtain the thermal data for the one or more surfaces in the fixed field of view and compute with the thermal data for the one or more surfaces in the fixed field of view during the analysis of the pixels in the fixed field of view;
obtain distance data for the one or more surfaces in the fixed field of view and compute with the distance data for the one or more surfaces in the fixed field of view during the analysis of the pixels in the fixed field of view; or
determine a relative humidity and compute with the relative humidity during the analysis of the pixels in the fixed field of view.

10. The system of claim 1, wherein the imaging analysis computer is configured to obtain the at least one baseline infrared image by:
acquiring a series of infrared images of the fixed field of view;
analyzing pixel data of each infrared image of the series to determine a pixel temperature for each pixel for each infrared image;
determining a range of pixel temperatures for each pixel without oil being present in the fixed field of view across the series of infrared images of the fixed field of view; and
setting the allowable variable difference in temperature to include the determined range of pixel temperatures for each pixel without oil.

11. The system of claim 10, wherein the imaging analysis computer is configured to obtain the at least one baseline infrared image by:
performing a statistical analysis of the range of pixel temperatures for each pixel without oil being present across the series of infrared images of the fixed field of view to determine an allowable distribution of pixel temperatures for each pixel; and
setting the at least one baseline infrared image so that each pixel includes the allowable distribution of pixel temperatures.

12. The system of claim 10, wherein the at least one baseline infrared image is a model of each pixel with the allowable distribution of pixel temperatures for each pixel, wherein the model of pixel is obtained by:
determining a distribution of the pixel temperatures for each pixel without oil being present across the series of infrared images;
identifying a maximum pixel temperature that is greater than the distribution of pixel temperatures by a first difference; and
setting the first difference from the distribution to indicate absence of oil for each pixel.

13. The system of claim 12, wherein the imaging analysis computer is configured to:
compare each pixel temperature in the one or more subsequent infrared images with the model of each pixel with the allowable distribution of pixel temperatures;
determine a difference between each pixel temperature in the one or more subsequent infrared images and the model of each pixel;
determine whether the difference is greater than a threshold difference,
when the difference is greater than the threshold difference, determine that the pixel is an oil pixel, or
when the difference is less than the threshold difference, determine that the pixel is a surface pixel.

14. The system of claim 13, wherein the imaging analysis computer is configured to:
determine a standard deviation of the distribution of the pixel temperatures for each pixel without oil being present across the series of infrared images; and
set the threshold difference as being a defined difference from the standard deviation.

15. A method for detecting viscosity of oil, the method comprising:
providing the system of claim 1;
obtaining at least one baseline infrared image of a fixed field of view without oil being present;
analyzing all pixels in the fixed field of view for changes from the at least one baseline infrared image to at least one subsequent infrared image;
identifying variable differences in temperatures for each pixel in the field of view between the at least one baseline infrared image and the at least one subsequent infrared image;
identifying one or more first pixels in the at least one subsequent infrared image having a first variable difference in temperature that is greater than a second variable difference in temperature for one or more second pixels in the at least one subsequent infrared image compared to the at least one baseline infrared image;
determining the one or more first pixels as being oil and the one or more second pixels as being devoid of oil based on the variable difference in temperature of each pixel in the fixed field of view;

determining an estimated viscosity of the oil in the one or more first pixels based on a comparison of the determined variable difference with viscosity data that correlates a variable difference in temperature with a viscosity, wherein the viscosity data includes a defined lower viscosity threshold value and a defined upper viscosity threshold value, wherein the estimated viscosity is interpolated between the lower viscosity threshold value and the upper viscosity threshold value; and generating a report that identifies the estimated viscosity for the oil in the fixed field of view.

16. The method of claim 15, further comprising:
determining a type of oil having the estimated viscosity; and
generating the report to identify the type of oil.

17. A method for detecting an oil leak, the method comprising:
providing a system for detecting an oil leak comprising at least one infrared imaging sensor and an imaging analysis computer operably coupled with the at least one infrared imaging sensor, wherein the imaging analysis computer is configured to detect an oil leak;
obtaining at least one baseline infrared image of a fixed field of view without oil being present;
determining a distribution of baseline temperature values for each pixel of the at least one baseline infrared image;
determining an allowable variable difference in temperature that is a range of temperatures within a defined distance from the distribution of the baseline temperature values for each pixel of the at least one baseline infrared image;
obtaining at least one subsequent infrared image of the fixed field of view;
determining a subsequent temperature value for each pixel of the at least one subsequent infrared image;
analyzing all pixels in the fixed field of view for changes from the distribution of baseline temperature values of each pixel in the at least one baseline infrared image to the subsequent temperature value of each pixel in the at least one subsequent infrared image;
identifying variable differences in temperatures for each pixel in the field of view between the at least one baseline infrared image and the at least one subsequent infrared image;
identifying one or more first pixels in the at least one subsequent infrared image having a first variable difference in temperature that is outside the range of temperatures of the allowable variable difference in temperature for the one or more first pixels in the at least one subsequent infrared image compared to the allowable variable difference in temperature for the one or more first pixels in the at least one baseline infrared image;
determining the one or more first pixels as being oil based on the first variable difference in temperature of the one or more first pixels being greater than the allowable variable difference in temperature of the one or more first pixels in the fixed field of view; and
generating an alert that identifies the presence of oil in the fixed field of view.

18. The method of claim 17, further comprising providing the alert from the imaging analysis computer by:
actuating an audible indicator;
actuating a visible indicator;
showing the alert on a display device; or
transmitting the alert to a remote device.

19. The method of claim 17, further comprising monitoring the fixed field of view to detect oil on a solid surface.

20. The method of claim 19, further comprising monitoring the solid surface selected from foliage, wood, plant, soil, rock, concrete, metal, composite, ceramic, plastic, rubber, or combination thereof.

21. The method of claim 17, wherein the fixed field of view includes at least one region of water, the method further comprising monitoring the fixed field of view to detect oil on water.

22. The method of claim 17, further comprising:
identifying a surface region in the fixed field of view that is a surface, the surface region having a surface temperature; and
identifying an oil region in the fixed field of view that is oil by having a variable difference in temperature for each pixel that is greater than the allowable variable difference in temperature for the surface region from the at least one baseline infrared image to the at least one subsequent infrared image.

23. The method of claim 22, further comprising:
determining the surface region in the fixed field of view in the at least one baseline infrared image as being devoid of oil, the surface region having the allowable variable difference in temperature for each pixel; and
determining the oil region in the fixed field of view in the at least one subsequent infrared image as having oil, the oil region having the first variable difference in temperature that is greater than the allowable variable difference in temperature for each pixel.

24. The method of claim 17, further comprising:
associating adjacent first pixels to identify an oil region;
determining a size of the oil region; and
generating an oil region size report that identifies the size of the oil region based on the associated adjacent first pixels; or
comparing the area of the oil region with a threshold area size and generate the alert once the oil region has an area that is at least the size of the threshold size, wherein the threshold area size is a defined value or a percentage of a region of interest.

25. The method of claim 17, further comprising:
determining whether or not water has surface elevation fluctuations and compensating for the surface elevation fluctuations during the analysis of the pixels in the fixed field of view;
determining that it is raining in the fixed field of view and monitoring the fixed field of view to detect oil on water;
determining whether or not the water has areas of reflected light and compensate for the areas of reflected light during the analysis of the pixels in the fixed field of view;
obtaining the thermal data for the one or more surfaces in the fixed field of view and compute with the thermal data for the one or more surfaces in the fixed field of view during the analysis of the pixels in the fixed field of view;
obtaining distance data for the one or more surfaces in the fixed field of view and compute with the distance data for the one or more surfaces in the fixed field of view during the analysis of the pixels in the fixed field of view; or determining a relative humidity and compute with the relative humidity during the analysis of the pixels in the fixed field of view.

26. The method of claim 17, further comprising obtaining the at least one baseline infrared image by:
   acquiring a series of infrared images of the fixed field of view;
   analyzing pixel data of each infrared image of the series to determine a pixel temperature for each pixel for each infrared image;
   determining a range of pixel temperatures for each pixel without oil being present in the fixed field of view across the series of infrared images of the fixed field of view; and
   setting the allowable variable difference in temperature to include the determined range of pixel temperatures for each pixel without oil.

27. The method of claim 26, further comprising obtaining the at least one baseline infrared image by:
   performing a statistical analysis of the range of pixel temperatures for each pixel without oil being present across the series of infrared images of the fixed field of view to determine an allowable distribution of pixel temperatures for each pixel; and
   setting the at least one baseline infrared image so that each pixel includes the allowable distribution of pixel temperatures.

28. The method of claim 27, wherein the at least one baseline infrared image is a model of each pixel with the allowable distribution of pixel temperatures for each pixel, further comprising obtaining the model of pixel by:
   determining a distribution of the pixel temperatures for each pixel without oil being present across the series of infrared images;
   identifying a maximum pixel temperature that is greater than the distribution of pixel temperatures by a first difference; and
   setting the first difference from the distribution to indicate absence of oil for each pixel.

29. The method of claim 28, further comprising:
   comparing each pixel temperature in the one or more subsequent infrared images with the model of each pixel with the allowable distribution of pixel temperatures;
   determining a difference between each pixel temperature in the one or more subsequent infrared images and the model of each pixel;
   determining whether the difference is greater than a threshold difference, when the difference is greater than the threshold difference,
   determine that the pixel is an oil pixel, or
      when the difference is less than the threshold difference, determine that the pixel is a surface pixel.

30. The method of claim 29, wherein the imaging analysis computer is configured to:
   determine a standard deviation of the distribution of the pixel temperatures for each pixel without oil being present across the series of infrared images; and
   set the threshold difference as being a defined difference from the standard deviation.

* * * * *